United States Patent Office 3,851,052
Patented Nov. 26, 1974

3,851,052
STABILIZED E-SERIES PROSTAGLANDINS
Donald C. Monkhouse, Waterford, Conn., assignor to
Pfizer Inc., New York, N.Y.
No Drawing. Filed Nov. 8, 1972, Ser. No. 304,814
Int. Cl. A61k 9/00, 27/00
U.S. Cl. 424—45      9 Claims

ABSTRACT OF THE DISCLOSURE

A stabilized pharmaceutical composition comprising an E-series prostaglandin and a storage stabilizing amount of an alkali metal sulfite salt.

Background of the Invention

This invention relates to stabilized pharmaceutical compositions of prostaglandins. In particular, it relates to alkali metal sulfite containing compositions of biologically active E-series prostaglandins or their analogs. The prostaglandins of the E-series are those which have at the nine position a carbonyl and at the eleven position a hydroxy.

The prostaglandins are C-20 unsaturated fatty acids which exhibit diverse physiological effects. For instance, the prostaglandins of the E-series are potent vasodilators (Bergstrom et al., Acta Physiol. Scand. 65: 332–33, 1965 and Bergstrom et al., Life Sci. 6: 449–455, 1967) and lower systemic arterial blood pressure (vasodepression) on intravenous administration (Weeks and King, Federation Proc. 23: 327, 1964: Bergstrom et al., 1965, op. cit.; Carlson, et al., Acta Med. Scand. 183: 423–430, 1968; and Carlson et al., Acta Physiol. Scand. 75: 161–169, 1969). Another well known physiological action for $PGE_1$ and $PGE_2$ is as a bronchodilator (Cuthbert, Brit. Med. J. 4: 723–726, 1969).

Still another important physiological role for the natural prostaglandins is in connection with the reproductive cycle. $PGE_2$ is known to possess the ability to induce labor (Karim et al., J. Obstet Gynaec. Brit. Cwlth. 77: 200–210, 1970), to induce therapeutic abortion (Bygdeman et al., Contraception, 4, 293 (1971) and to be useful for control of fertility (Karim, Contraception, 3, 173 (1971)). Patents have been obtained for several prostaglandins of the E-series as inducers of labor in mammals (Belgian Pat. 754,158 and West German Patent 2,034,-641).

Still other known physiological activities for $PGE_1$ are in the inhibition of gastric acid secretion (Shaw and Ramwell, in: Worcester Symp. on Prostaglandins, New York, Wiley, 1968, p. 55–64) and also of platelet aggregation (Emmons et al., Brit. Med. J. 2: 468–472, 1967).

The application of prostaglandins in a number of areas has been severely hampered by their apparent instability, especialy in solution. Karim et al. (Eur. J. Pharmacol. 4, 416, 1968) measured the biological activity of saline solutions containing 100 ng./ml. $PGE_1$, $PGE_2$, $PGF_{1\alpha}$, and $PGF_{2\alpha}$ stored at various pH values at room temperature. The PGE compounds showed 25–40% loss of biological activity after 60 days at pH 5–7, while the PGF compounds were still fully active after 182 days. Other prostaglandin stability studies have been carried out by Andersen (J. Lipid. Res., 10, 320, 1969), Brummer (J. Pharm. Pharmacol., 23, 804, 1971) and others and show similar results. The need for a method of storing solutions of E-series prostaglandins for long periods of time will be readily apparent.

Summary of the Invention

The present invention comprises a stabilized pharmaceutical composition comprising a biologically active E-series prostaglandin together with a storage stabilizing amount of an alkali or alkaline earth metal sulfite salt. Especially preferred is a composition containing a pharmaceutically acceptable liquid medium for example, an aliphatic alcohol such as ethanol. Particularly preferred salts include sodium metabisulfite and sodium sulfite. The instance wherein the composition also contains a volatile aerosol propellant is also preferred. A storage stabilizing amount of alkali metal sulfite salt is from about 0.5 to 20 moles per mole of prostaglandin and an amount of from 1.0 to 10 moles per mole of prostaglandin is preferred.

Detailed Description of the Invention

Although no limitations are intended to be put on the present invention hereby, it is believed that the sulfite containing species forms a complex with the E-type prostaglandins or their homologs. In the course of reacting prostaglandins and their homologs with various sulfites, at pH values of from about 3 to about 8, it was determined that the reaction products so formed exhibited high stability. Although bisulfites are employed elsewhere as antioxidants, their role in the present invention is evidently more complex. This is apparent since other antioxidants such as propyl gallate or ascorbic acid have not been found to stabilize prostaglandins. Furthermore, the decomposition is not accelerated by bubbling oxygen through aqueous solutions of prostaglandins.

It is probable that the sulfites form an "adduct" or "complex" with the cyclopentanone portion of E-series prostaglandins and in so doing effectively prevent elimination of the β-OH group. The formula below illustrates how this reaction may occur in one instance, i.e., between $PGE_2$ and sodium bisulfite.

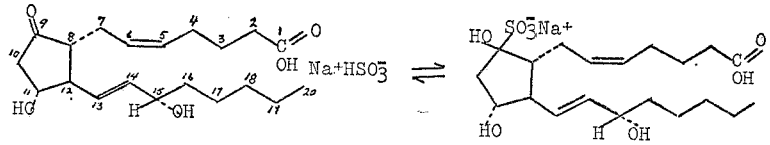

Preferred alkali metals and alkaline earth metals of this invention are sodium, lithium, potassium, magnesium, barium, calcium, and strontium.

Examples of preferred sulfite salts of this invention are the alkali metal sulfite salts such as $MgSO_3 \cdot 6H_2O$, $CaSO_3 \cdot 2H_2O$, $Na_2SO_3$, $Na_2SO_3 \cdot 7H_2O$, $Na_2S_2O_5$, $Li_2SO_3$, $K_2SO_3$, $K_2S_2O_5$, $K_2S_2O_5 \cdot 1.5H_2O$, $KHSO_3$, and $K_2SO_3 \cdot 2H_2O$ but diverse sulfite bearing compounds are believed to be equally effective. Such compounds include, for example, ammonium sulfite, sodium formaldehyde bisulfite, sodium formaldehyde sulfoxylate, and acetone sodium metabisulfite, amine complexes such as $A \cdot HSO_3$ or $A \cdot (SO_3)_2$ where A=mono, di, or triethanolamine; sulfur dioxide dissolved in an aliphatic alcohol; sulfur dioxide dissolved in water to form sulfurous acid or in the presence of excess sulfur to form polythionates; and clathrates of sulfur dioxide, for example, where the cage compound is hydroquinone or phenol and the guest molecule is sulfur dioxide.

By use of pharmaceutical compositions comprising an E-series prostaglandin or analog thereof and one of the aforementioned sulfites, the bronchodilator activity of the prostaglandin can be successfully retained in, for example, aged ethanolic solutions. This is especially important for use in aerosol bronchodilator formulations.

Table I below demonstrates the effectiveness of bisulfites containing preparations of prostaglandin $E_2$ in retaining its potency for protecting guinea pigs against histamine-induced bronchospasms after storage at elevated temperatures.

TABLE I

| Drug | Drug concentration, mg./ml. | Percent EtOH | Solvent $Na_2S_2O_5$, mg./ml. | Treatment for 13 days,[1] °C. | Percent protection [2] |
|---|---|---|---|---|---|
| $E_2$ | 0.5 | 90 | | 0 | 61 |
| $E_2$ | 0.5 | 90 | | 60 | 10 |
| $E_2$ | 0.5 | 90 | 0.15 | 60 | 45 |
| $E_2$ | 0.5 | 90 | 1.5 | 60 | 73 |
| $E_2$ | 0.5 | 90 | | 0 | 68 |
| $E_2$ | 0.5 | 90 | | 60 | 24 |
| $E_2$ | 0.5 | 90 | 1.5 | 60 | 65 |
| $E_2$ | 0.75 | 50 | | 0 | 74 |
| $E_2$ | 0.75 | 50 | | 60 | 29 |
| $E_2$ | 0.75 | 50 | 1.5 | 60 | 58, 67 |

[1] Sealed in ampules.
[2] Stock solutions diluted to 56-100 mcg./ml with ethanol or water. These diluted solutions were nebulized into a perspex box and the guinea pigs were exposed to the direct spray for one minute with an additional minute allowed for inhalation. The guinea pig was then placed into another box into which a histamine solution (2 mg./ml.) had been sprayed for one minute. A subjective evaluation of the breathing pattern in the pig was made after 60 to 75 seconds in this atmosphere (0=no effect, 4=convulsions).
Percent protection=
$$\frac{(\Sigma control\ evaluation - \Sigma experimental\ evaluation) \times 100}{\Sigma control\ evaluation}$$
where 100% protection=no obvious reaction to histamine; 0% protection=all reacted similar to controls.

The stability of E-series prostaglandins used in induction of labor, induction of abortion, and fertility control will be equally enhanced by the compositions of this invention.

The N-substituted prostaglandin carboxamides such as N-acetylprostaglandin $E_2$ carboxamide; the tetrazoyl derivatives of prostaglandins; the oxaprostaglandins; and the ω-substituted pentanorprostaglandins are especially important examples of biologically active protaglandins of the E-series useful in the compositions of the present invention.

The synthesis of the natural prostaglandins of the E-series has been performed by Prof. E. J. Corey and his co-workers (Corey et al., J. Amer. Chem. Soc., 92, 2586 (1970); and references cited therein), and E-series prostaglandins made by the reaction sequence as well as those made by other schemes or isolated from natural material are suitable for use in the compositions of this invention. Also suitable in the processes of this invention are 15-lower alkyl derivatives of the natural prostaglandins such as are described by G. Bundy et al., Anal., N.Y. Acad. Sci., 180, p. 76, 1971.

For the first step in the preparation of the N-substtiuted prostaglandin carboxamides, the appropriate hemiacetal precursor is caused to react with the disodium salt of a novel substituted carboxamide butyltriphenylphosphonium bromide, in a molar ratio of from about 1:2 to 1:5. Such precursors are as follows:

2-[5α-hydroxy-3α-(tetrahydropyran-2-yloxy)-2β-(3α-(tetrahydropyran-2-yloxy)-trans-1-octen-1-yl) cyclopent-1α-yl]acetaldehyde, γ-hemiacetal for $PGE_1$, $PGE_2$, and 13,14-dihydro-$PGE_1$ 2-[5α-hydroxy-3α-(tetrahydropyran-2-yloxy)-2β-(3β-lower alkyl-3-α-(tetrahydropyran-2-yloxy)-trans-1-octen-1-yl) cyclopent-1α-yl] acetaldehyde, γ-hemiacetal for the 15-lower alkyl derivative of this same prostaglandins;

2-[5α-hydroxy-3α-tetrahydropyran-2-yloxy)-2β-(3α-(tetrahydropyran-2-yloxy)oct-1-yl]cyclopent-1α-yl]acetaldehyde, γ-hemiacetal for 13,14-dihydro-$PGE_2$;

2-[5α-hydroxy-3α-(tetrahydropyran-2-yloxy)-2β(3β-lower alkyl-3α-(tetrahydropyran-2-yloxy)-oct-1γyl]-cyclopent-1α-yl]acetaldehyde, γ-hemiacetal for the 15-loweralkyl derivatives of 13,14-dihydro-$PGE_2$;

and 2-[5α-hydroxy-3α-(tetrahydropyran-2-yloxy)-2β-(3α-(tetrahydropyran-2-yloxy)-cis-5-trans-1-octadien-1-yl)cyclopent-1α-yl]acetaldehyde γ-hemiacetal for $PGE_3$.

The reaction will preferably be carried out at temperatures of about 25–65° C. in an inert solvent such as dimethylsulfoxide and in an inert atmosphere, for a period of up to about 4 hours or until the reaction is essentially complete.

The substituted carboxamide-containing intermediates produced in the first step, as described above, may be converted by published procedures (Corey et al., J. Am. Chem. Soc., 93, 1490 (1971) to the substituted carboxamide analogs of any of the prostaglandins listed above. These procedures are further described in detail in preparations $A_1$–$A_4$ below and the steps entailed are summarized in the reaction schemes A and B below, wherein R is alkanoyl, cycloalkanoyl, or alkenoyl of from 2 to 10 carbon atoms; aryoyl or substituted aryoyl from 7 to 11 carbon atoms wherein said substituents may be methyl, halogen, or methoxy; alkylsulfonyl from 1 to 7 carbon atoms; phenylsulfonyl or mono-substituted phenylsulfonyl wherein said substituent may be methyl, halogen, or methoxy; styrylsulfonyl; or 2-thiophenesulfonyl; and THP is tetrahydropyranyl.

The utility of these prostaglandins is the same as for the naturally occurring E-series prostaglandins. For example, a stabilizer of N-acetyl $PGE_2$-carboxamide may be employed as an aerosol to increase nasal potency using a dosage of from about 10–500 mg./dose.

REACTION SCHEME A

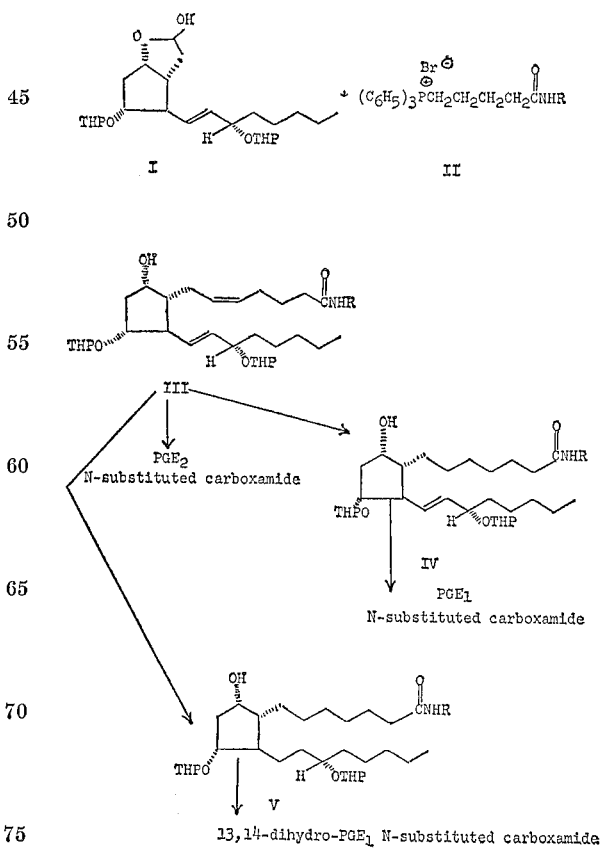

REACTION SCHEME B

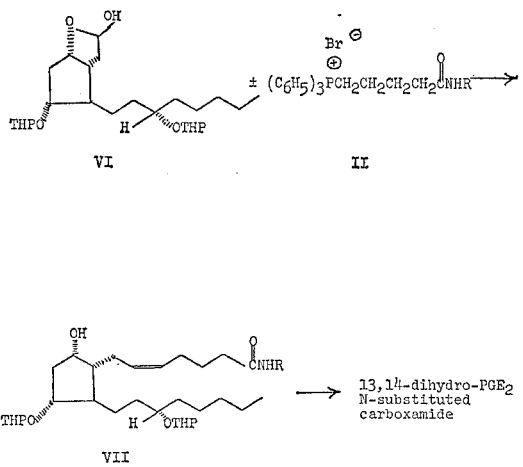

As shown in Reaction Scheme A, Hemiacetal I is caused to react with the novel reagent II to produce III, the N-substituted carboxamide analog of the bis-THP ether of $PGF_{2\alpha}$.

III→ $JG_2$-N-substituted carboxamide requires treatment with Jones reagent to form a second intermediate before the acid treatment and purification as above.

III→ $PG_1$-N-substituted carboxamide follows exactly the same method as outlined for the $PGE_2$ above.

III→ 13,14-dihydro PGE, N-substituted carboxamide requires a reduction with palladium on carbon and methanol to produce V which is then hydrolyzed with aqueous acetic acid, and purified as above.

To produce the other 13,14-dihydro derivatives one follows the procedures outlined above. Alternatively the $PGE_2$-N-substituted carboxamides may be reduced with palladium on carbon in methanol to produce the 13,14-dihydro $PGE_1$-N-substituted carboxamide.

Referring now to Reaction Scheme B, Hemiacetal VI is caused to react with the novel reagent II to produce VII, the N-substituted carboxamide analog of the bis-THP ether of 13,14-dihydro $PGF_{2\alpha}$.

VII→ 13,14-dihydro $PGE_2$-N-substituted carboxamide requires treatment with Jones reagent to form a second intermediate before acid treatment and purification as above.

To produce the 15-lower alkyl derivatives of all of the above mentioned prostaglandin N-substituted carboxamides, one merely employs a hemiacetal I or hemiacetal VI with a lower alkyl moiety in the 15 position and proceeds as above to produce the desired compound.

To produce $PGE_3$ N-substituted carboxamide, hemiacetal VIII is employed as the starting material and all of the other reaction steps are identical to those given above.

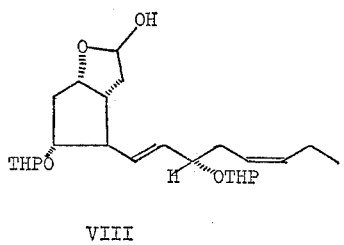

For the first step in the preparation of the above named tetrazoyl prostaglandin analogs, the appropriate hemiacetal precursor is caused to react with the disodium salt of a novel reagent, 4-(tetrazol-5-yl)butyltriphenylphosphonium bromide, in a molar ratio of from about 1:2 to 1:5. Such precursors are the same as previously indicated for the N-substituted prostaglandin carboxamides.

The reaction will preferably be carried out at temperatures of about 25–65° C. in an inert solvent such as dimethylsulfoxide and in an inert atmosphere, for a period of up to about 4 hours or until the reaction is essentially complete.

The tetrazol-containing intermediates produced in the first step, as described above, may be converted by published procedures (Corey et al., *J. Am. Chem. Soc.*, 93, 1490 (1971) to the tetrazoyl analogs of any of the prostaglandins listed above. These procedures are further described in detail in Preparation $B_1$–$B_4$ below and the steps entailed are summarized in the flow sheet below. THP is tetrahydropyranyl.

The utility of these prostaglandins is the same as for the natural prostaglandins of the E-series. For example, a stabilized preparation of $PGE_2$-tetrazoyl could be administered orally at a level of from about 0.2–5.0 mg./dose to induce abortion.

As shown in Reaction Scheme C, Hemiacetal I is caused to react with the novel reagent II to produce III, the tetrazoyl analog of the bis-THP ether of $PGE_{2\alpha}$.

III→$PGE_2$-tetrazoyl requires treatment with Jones reagent to form a second intermediate before the acid treatment and purification by chromatography.

III→$PGE_1$-tetrazoyl required a reduction with palladium on carbon and methanol to produce IV which then follows exactly the same method as outlined for $PGE_2$.

III→ 13,14-dihydro $PGE_1$ requires a reduction with palladium on carbon and methanol to produce V which is then treated as above in the synthesis of $PGE_2$ tetrazoyl.

Referring now to Reaction Scheme D, Hemiacetal VI is caused to react with the novel reagent II to produce VII, the tetrazoyl analog of the bis-THP ether of 13,14-dihydro $PGF_{2\alpha}$.

VII→13,14-dihydro $PGE_2$-tetrazoyl requires treatment with Jones reagent to form a second intermediate before acid treatment and purification by chromatography.

To produce the 15-lower alkyl derivatives of all of the above mentioned prostaglandin tetrazoyls, one merely employs hemiacetal I or the hemiacetal VI with a lower alkyl moiety in the 15 position and proceeds as above to produce the desired compound.

To produce $PGE_3$ tetrazoyl, hemiacetal VIII is employed as the starting material and all of the other reaction steps are identical to those given above.

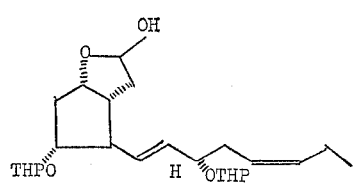

REACTION SCHEME C

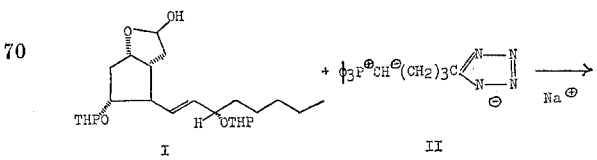

REACTION SCHEME E

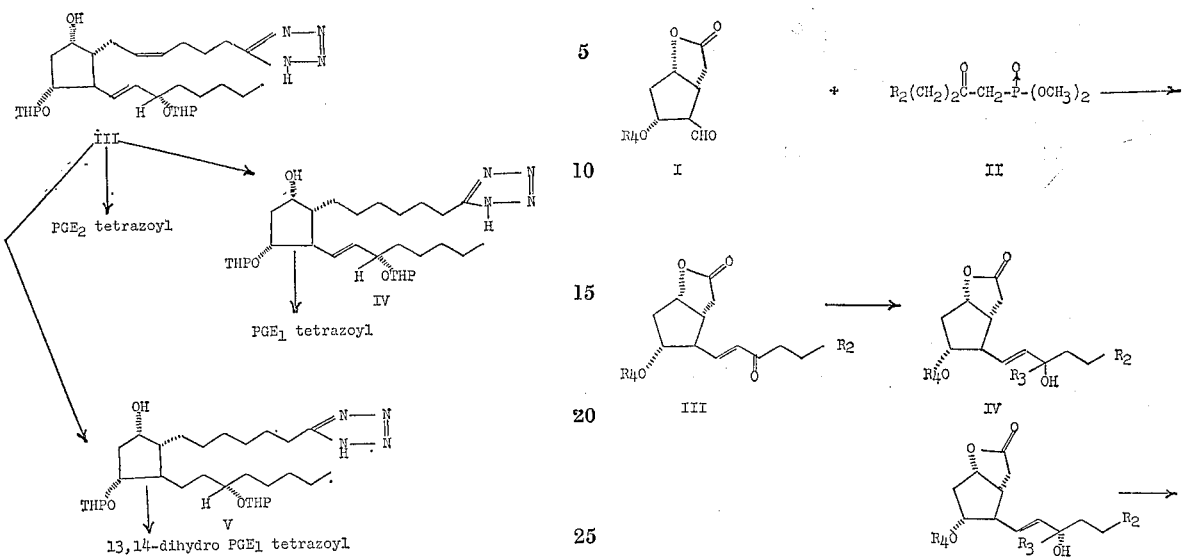

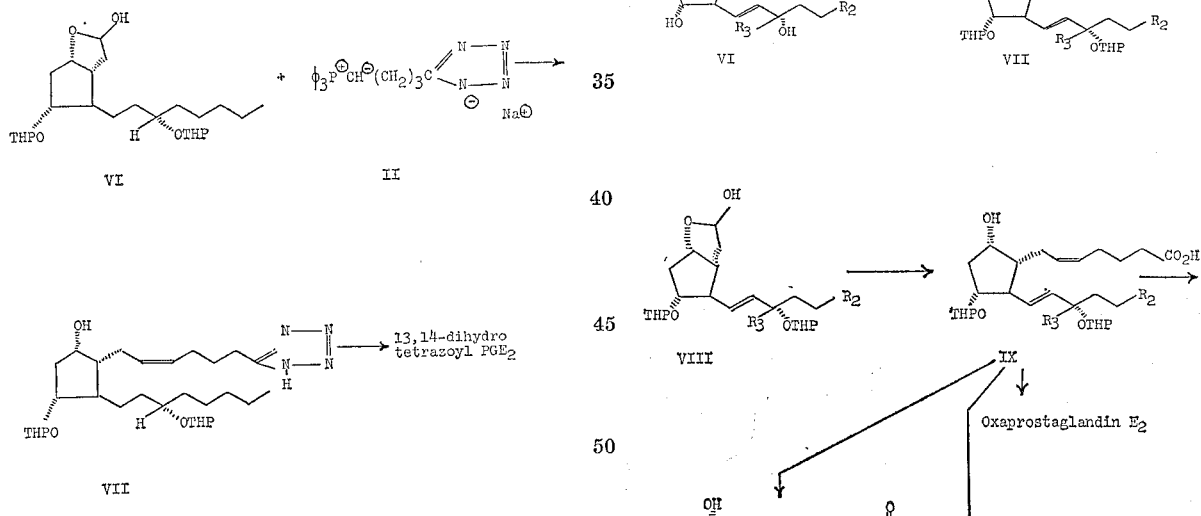

REACTION SCHEME D

The steps involved in the preparation of the above mentioned oxaprostaglandins can best be summarized by a flowsheet such as that shown below. A detailed preparation is given in Preparations $C_1$–$C_9$ below. The values for the R groups are as follows:

$R_2$ is OR' or $CH_2OR'$ wherein R' is alkyl of one to five carbon atoms;

$R_3$ is hydrogen or alkyl of one to three carbon atoms;

$R_4$ is tetrahydropyranyl or —C—R" wherein R" is alkyl of one to five carbon atoms, phenyl, p-phenylbenzene; and THP is tetrahydropyranyl.

The utility of these prostaglandins is the same as for the natural prostaglandins of the E-series. For example, for induction of abortion an appropriate treatment would be a stabilized preparation of 19-oxa PGE administered as an intravenous infusion. A suitable dosage would be from about 5 to 100 µg./min. administered for a period of from about 2 to 10 hours.

REACTION SCHEME F

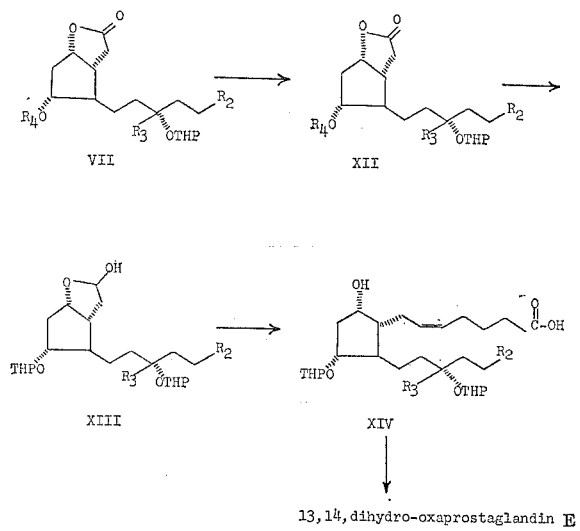

13,14,dihydro-oxaprostaglandin E

As shown in Reaction Scheme E, Aldehyde I is caused to react with the novel reagent II to produce ketone III. The reactants are employed in substantially equimolar proportions, and the reaction is preferably run for about 30 minutes.

III is treated with 1,2-dimethoxyethane and zinc borohydride, for about 1 hour, to produce alcohols IV and V which are then separated using, for example, column chromatography with ether as eluent. If the 15-lower alkyl derivative is desired, lower alkyl lithium, such as methyl lithium, is added to III at this time.

V→VI involves treatment with anhydrous potassium carbonate for about 1 hour, followed by hydrochloric acid and extraction, for example, with ethyl acetate and finally concentration.

VI→VII requires treatment with 2,3-dihydropyran and p-toluene-sulfonic acid for about 15 minutes in a nitrogen atmosphere, and then combination with ether, washing with, for example, sodium bicarbonate and then brine, and then concentration.

VII→VIII is performed by reaction for about 1 hour with diisobutylaluminum hydride in n-hexane cooled to −78° C. in a nitrogen atomsphere. The mixture is then mixed with ether, washed, dried and concentrated.

VIII→IX is brought about by reaction with (4-carbohydroxy - n - butyl)-triphenylphosphonium bromide and methylsulfinylmethide in dimethyl sulfoxide at room temperature for at least 2 hours. The mixture is then acidified with, for example, aqueous hydrochloric acid, and then is extracted with ethyl acetate, evaporated, and concentrated.

IX→Oxaprostaglandin $E_2$ requires treatment with Jones reagent for about 20 minutes at −10° C. to form a second intermediate before the acid treatment and purification by column chromatography.

IX→Oxaprostaglandin $E_1$ requires a reduction with palladium on carbon and methanol to produce X which then follows exactly the same method as outlined for the $PGE_2$ series above.

IX→ 13,14-dihydro-oxaprostaglandin $E_1$ requires a reduction with palladium on carbon and methanol to produce XI and then one follows the procedures outlined above.

Referring now to Reaction Scheme F, Lactone VII is reduced with palladium on carbon to form XII, which is then treated with diisobutyl aluminum hydride to produce Hemiacetal XIII.

XIII→XIV is analogous to VIII→IX of Reaction Scheme E.

XIV→ 13,14-dihydro-oxaprostaglandin $E_2$ requires treatment with Jones reagent for about 20 minutes at −10° C. to form a second intermediate before acid treatment and purification as above.

Novel reagent II is prepared by contacting an appropriate phosphonate, such as dimethyl methyl phosphonate, in reaction inert solvent such as tetrahydrofuran and in a nirtogen atomsphere, with an organo-lithium compound, such as n-butyllithium. Then an appropriate alkoxy ester, such as methyl-4-methoxybutyrate is added, and the product is purified by extraction in methylene chloride and it is concentrated.

Analogous reaction sequences can be utilized for the preparation of 17- and 20-oxaprostaglandins. For the preparation of the 17-oxaprostaglandins, aldehyde I is treated with the novel phosphonate IIa to give the enone IIIa (where $R_2$=OR', and R' is as previously defined). Similarly, for the preparation of the 20-oxaprostaglandins, aldehyde I is treated with the novel phosphonate IIb to give the enone IIIb. Subsequent conversions of IIIa and IIIb to 17- and 20-oxaprostaglandins, respectively, follow the sequences outlined in Reaction Schemes E and F.

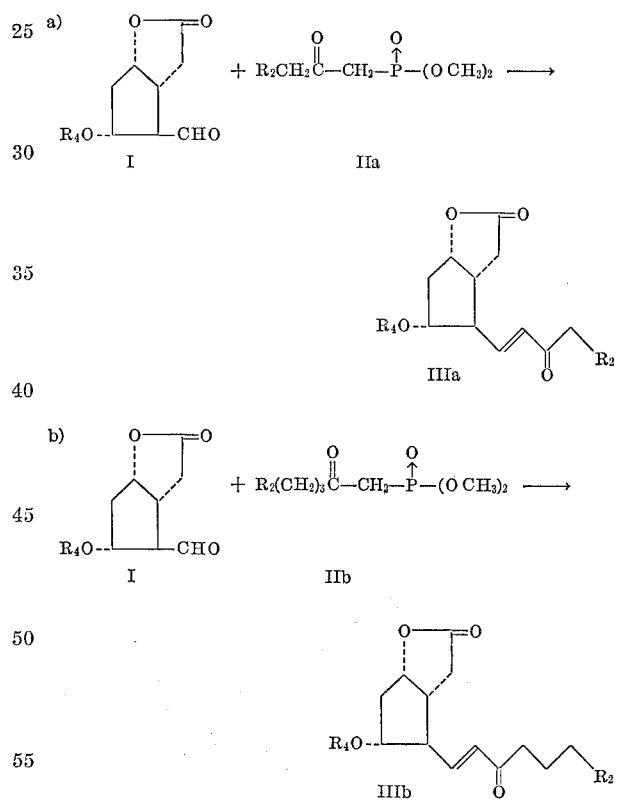

The method for preparation of the above mentioned ω-substituted pentanorprostaglandin is best summarized by the reaction schemes below and a detailed preparation is shown in Preparations $D_1$–$D_9$ below. These prostaglandins share the utility of the natural E-series prostaglandins; i.e. lowering systemic arterial blood pressure and an appropriate dose would be from .005 to .05 mg./kg./day in the form of capsules or tablets. Another use would be to increase nasal potency and an appropriate dose would be from about 3–500 μg./dose for this utility.

In the schemes below

Ar is α- or β-furyl, α- or β-thienyl, α- or β-naphthyl, phenyl, 3,4-dimethoxyphenyl, 3,4-methylenedioxyphenyl, 3,4,5-trimethoxyphenyl or monosubstituted phenyl wherein said substituent is halo, trifluoromethyl, phenyl, lower alkyl or lower alkoxy;
$R_6$ is hydrogen or lower alkyl;
$n$ is an integer of from 0 to 5.

As shown in Scheme G, the first step ($\underline{1} \to \underline{2}$) is the condensation of the appropriate ester with a dialkyl methylphosphonate to produce ketophosphonate $\underline{2}$. Typically, the desired methyl ester is condensed with dimethyl methyl phosphonate.

In $\underline{2} \to \underline{3}$ the ketophosphonate $\underline{2}$ is caused to react with the known [Corey et al., J. Am. Chem. Soc., 93, 1491 (1971)] aldehyde H to produce, after chromatography or crystallization, the enone $\underline{3}$.

The enone $\underline{3}$ can be converted to a mixture of tertiary alcohols $\underline{13}$ and $\underline{14}$ by reaction with the appropriate lithium alkyl and the isomeric $\underline{13}$ and $\underline{14}$ can be separated by column chromatography. The enone $\underline{3}$ can be reduced with zinc borohydride to a mixture of alcohols, $\underline{4}$ and $\underline{5}$ which can be separated as above. In this reaction ethers such as tetrahydrofuran or 1,2- dimethoxy ethane are usually employed as solvents, although occasionally methanol is preferred to ensure specificity of reduction. Further transformations of $\underline{4}$ are shown on scheme B.:

Referring now to reaction scheme H, $\underline{4} \to \underline{6}$ is a base catalized transesterification in which the p-biphenyl-carbonyl protecting group is removed. This is most conveniently conducted with potassium carbonate in methanol or methanol-tetrahydrofuran solvent. $\underline{6} \to \underline{7}$ involves the protection of the two free hydroxyl groups with an acid-labile protecting group. Any sufficiently acid-labile group is satisfactory; however, the most usual one is tetrahydropyranyl, which can be incorporated in the molecule by treatment with dihydropyran and an acid catalyst in an anhydrous medium. The catalyst is usually p-toluenesulfonic acid.

SCHEME G

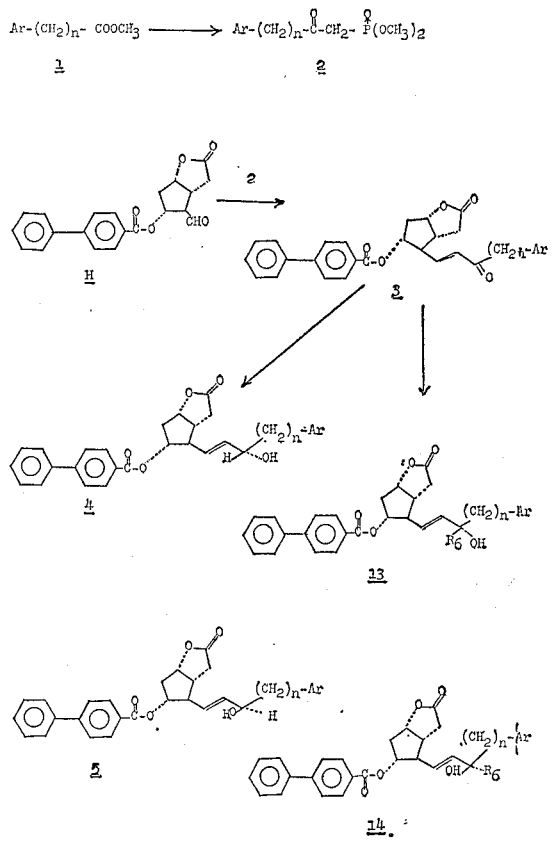

SCHEME H

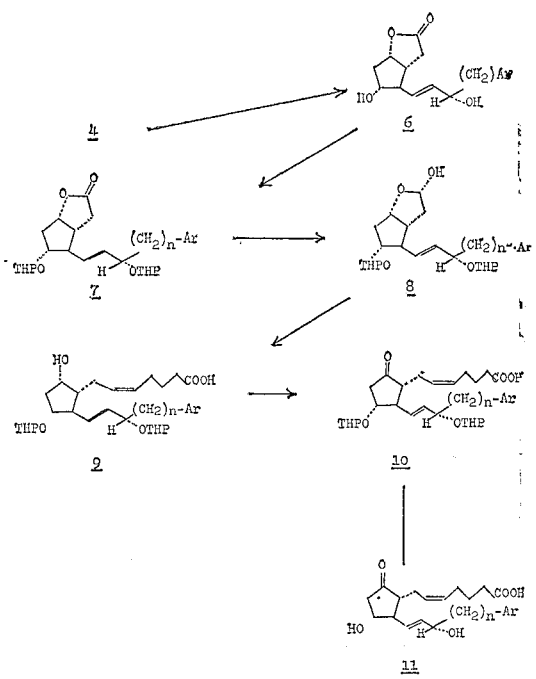

$\underline{7} \to \underline{8}$ is a reduction of the lactone $\underline{7}$ to the hemiacetal $\underline{8}$ using diisobutyl aluminum hydride in an inert solvent. Low reaction temperatures are preferred and $-60°$ to $-70°$ C. are usual. However, higher temperature may be employed if over-reduction does not occur. $\underline{8}$ is purified, if desired, by column chromatography.

$\underline{8} \to \underline{9}$ is a Wittig condensation in which hemiacetal $\underline{8}$ is reacted with (4-carbohydroxy-n-butyl) triphenylphosphonium bromide in dimethyl sulfoxide, in the presence of sodium methylsulfinyl methide. $\underline{9}$ is purified as above.

$\underline{9} \to \underline{10}$ is an oxidation of the secondary alcohol $\underline{9}$ to the ketone $\underline{10}$. This may be accomplished using any oxidizing agent which does not attack double bonds; however, the Jones reagent is usually preferred. The product is purified as above.

$\underline{10} \to \underline{11}$ is carried out by acidic hydrolysis of the tetrahydropyranzl groups. Any acid may be used which does not cause destruction of the molecule in the course of the removal of the protecting group; however, this is accomplished most often by use of 65% aqueous acetic acid. The product is purified as above.

SCHEME I

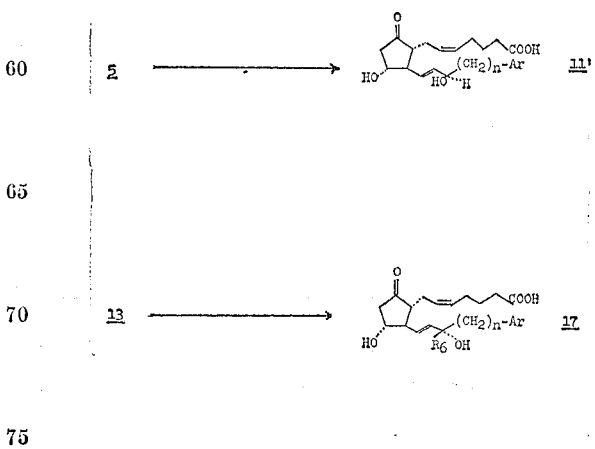

3,851,052

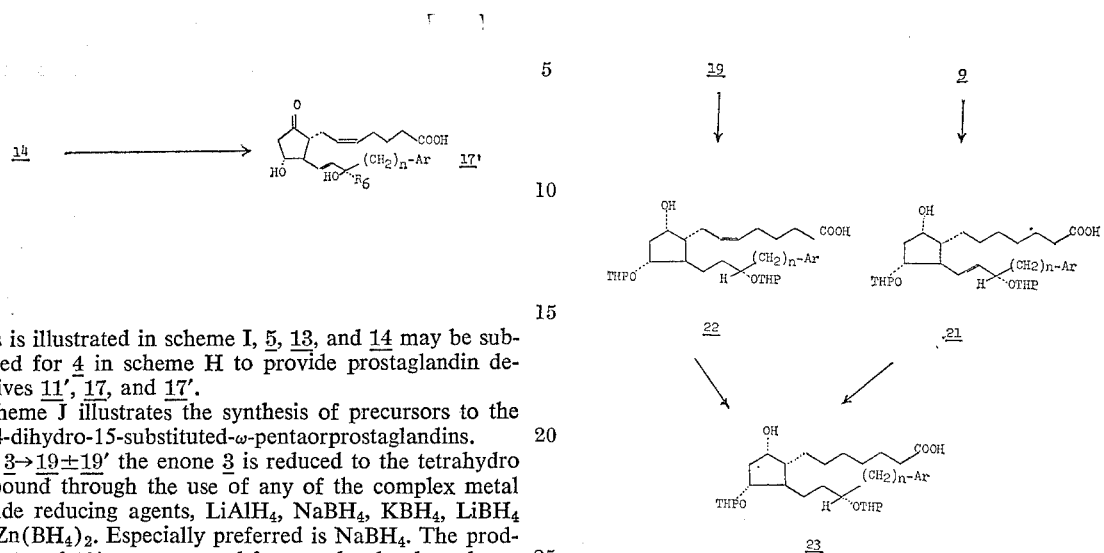

As is illustrated in scheme I, 5, 13, and 14 may be substituted for 4 in scheme H to provide prostaglandin derivatives 11', 17, and 17'.

Scheme J illustrates the synthesis of precursors to the 13,14-dihydro-15-substituted-ω-pentaorprostaglandins.

In 3→19±19' the enone 3 is reduced to the tetrahydro compound through the use of any of the complex metal hydride reducing agents, LiAlH$_4$, NaBH$_4$, KBH$_4$, LiBH$_4$ and Zn(BH$_4$)$_2$. Especially preferred is NaBH$_4$. The products, 19 and 19', are separated from each other by column chromatography.

Furthermore, the compounds 4 and 5 of Scheme G can be reduced catalytically with hydrogen to 19 and 19' respectively. The stage at which the double bond is reduced is not critical, and hydrogenation of 6 or 7 of scheme H will also afford useful intermediates for the 13,14 dihydro prostaglandin analogs of the present invention. This reduction may be achieved with either a homogenous catalyst such as tristriphenylphosphinerhodiumchloride, or with a heterogeneous catalyst such as platinum, palladium or rhodium. In a similar way the precursors to the 15-lower alkyl-15-substituted-ω-pentanorprostaglandins are synthesized by substituting compounds 13 and 14 for 4 and 5 respectively, in the synthesis just described. The conversion of 19, 19', 20' and 20 to their respective prostaglandins follows the route shown in scheme H when 4 is replaced by 19, 19', 20' and 20 to yield the 13,14-dihydro PGE$_2$ series of prostaglandin derivatives containing hydrogen or lower alkyl group at carbon 15.

SCHEME J

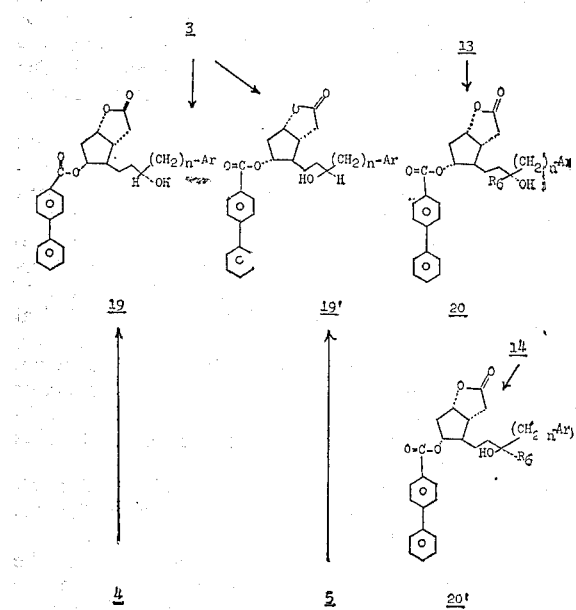

SCHEME K

Scheme K illustrates the preparation of the various reduced 15-substituted-ω-pentanorprostaglandin precursors:

19→22 is carried out as illustrated on Scheme B for 4→9. 22 can be used as both a precursor to 13,14-dihydro 15 - substituted-ω-pentanorprostaglandin of the "2-series" or as an intermediate to 23, a precursor to a 13,14-dihydro-15-substituted-ω-pentanorprostaglandin of the "1-series". 22→23 is carried out by catalytic hydrogenation using the catalyst described for the reduction of 4→19 of Scheme D. Intermediates of the type 21 are prepared by selective reduction of the 5-6 cis double bond at low temperature using catalysts such as those described for 4→19 and 17→23. Especially preferred for this reduction is the use of palladium on carbon as a catalyst and a reaction temperature of −20°. Intermediates of the type 21 are not only precursors to 15-substituted-ω-pentanorprostaglandins of the "1-series" through the route 9→15 of scheme H but also as a precursor to compounds of the type 23 through the route already discussed for 22→23. Furthermore, the 15-substituted-ω-pentanorprostaglandins by 19, 19', 20' and 20 to yield the 13,14-dihydro PGE$_2$, PGA$_2$ and PGF$_2$ series of prostaglandin derivatives containing hydrogen or lower alkyl group at carbon 15.

Scheme K illustrates the preparation of the various reduced 15-substituted-ω-pentanorprostaglandin precursors:

19→22 is carried out as illustrated on Scheme H for 4→9. 22 can be used as both a precursor to a 13,14-dihydro 15-substituted - ω - pentanorprostaglandin of the "1-series." 22→23 is carried out by catalytic hydrogenation using the catalyst described for the reduction of 4→19 of Scheme D.

Intermediates of the type 21 are prepared by selective reduction of the 5–6 cis double bond at low temperature using catalysts such as those described for 4→19 and 17→23. Especially preferred for this reduction is the use of palladium on carbon as a catalyst and a reaction temperature of −20° C. Intermediates of the type 21 are not only precursors to 15-substituted - ω - pentanorprostaglandins of the "1-series" through the route 9→15 of scheme B, but also as a precursor to compounds of the type 23 through the route already discussed for 22→23. Furthermore, the 15-substituted-ω-pentanorprostaglandins of the E$_1$ series may be obtained directly from the corresponding prostaglandin analog of the "2-series" by first protecting the hydroxyl by introducing dimethyl isopropyl silyl groups, reducing selectively the cis double bond, and removing the protecting group.

The introduction of the protecting group is usually accomplished by treatment of the prostaglandin analog with dimethyl isopropyl chlorosilane and triethylamine, the reduction is accomplished as discussed above for 9→21 and removal of the protecting group is accomplished by contacting the reduced protected compound with 3:1 acetic acid:water for 10 minutes or until reaction is substantially complete.

The $C_{15}$ epimers of 21, 22 and 23 can be used as precursors to the 15-epi series of prostaglandin derivatives described above, and 15 - lower - alkyl - 15 - substituted-ω-pentanorprostaglandins reduced at the 5–6 and/or the 13,14 position and their $C_{15}$ epimers can be prepared from the appropriately substituted analogs of 9 and 19 whose syntheses follow those of Scheme G and H.

13,14 - dihydro - 15 - lower alkyl - 15 - substituted-pentanorprostaglandins are available from the appropriately substituted precursors via Scheme I.

Certain of the prostaglandins named above are also useful in the form of their para-phenylphenol esters. These specific esters are valuable because they are very easily crystallized, thereby affording the opportunity to recover them in highly pure form and outstanding yield whereas prostaglandins in general ordinarily present severe crystallization problems. The new para-phenylphenol esters exhibit the activities of the corresponding parent novel compounds and in addition possess the advantage of a flattened activity versus time curve which is often advantageous. Furthermore, *in vivo* experiments have demonstrated that such esters cause a reduced incidence of gastro intestinal side effects.

The compounds in the form of the para-phenyl-phenol esters are prepared by procedures already described with appropriate substitution of corresponding intermediates in paraphenylphenol ester form for the intermediates employed in the foregoing reaction schemes. Thus, for example, in Reaction Scheme H compounds 9 and 10 may be esterified with para-phenylphenol in the presence of dicyclohexylcarbodiimide to provide para-phenylphenol esters of precursors to 15-omega pentanorprostaglandin para-phenylphenol esters. These can, through steps 9–12, 10–11, and 11–12, be converted to the novel para-phenylphenol esters mentioned above. Further, compounds 11, 12 and 15 can likewise be esterified with para-phenylphenol and dicyclohexylcarbodiimide to provide the desired esters. In addition, the para-biphenyl ester moiety can be introduced at an earlier stage by using in step 8–9, a tri-para-phenylphenol ortho ester phosphonium bromide of the structure

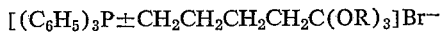

wherein R equals para-phenylphenol to provide the corresponding ortho ester of 9 which can be carried through steps 9–15 yield the desired para-phenylphenol esters. An example of the preparation of such an ester is given in Preparation E below.

The herein described compositions can be administered to humans by the oral, parenteral, nasal, or vaginal routes of administration. In general, the dosages administered will be the same for natural prostaglandins or for any of the other biologically active prostaglandins described above and will usually range from about 0.2 μg. to about 20 mg. per kg. of body weight per day, although variations will necessarily occur depending upon the weight and condition of the subject being treated and the particular route of administration chosen.

When aqueous suspensions and/or elixirs are desired for oral administration, the essential active ingredient therein may be combined with the various sweetening or flavoring agents, coloring matter or dyes and, if so desired, emulsifying and/or suspending agents as well, together with such diluents as water, ethanol, propylene glycol, glycerin and various like combinations thereof.

In general, most cases of solid-state degradation encountered with pharmaceutical solid dosage forms depend upon solvolysis of the substrate in a residue from a granulation liquid, or from an entrapped solvate of crystallization or, more simply, in surface moisture from dosage form excipients. In those situations the addition of bisulfite would saturate the surface moisture and inhibit degradation of prostaglandins.

For purposes of oral administration, tablets containing various excipients such as sodium citrate, calcium carbonate and calcium phosphate may be employed along with various disintegrants such as starch and preferably potato or tapioca starch, alginic acid and certain complex silicates, together with binding agents such as polyvinylpyrrolidone, sucrose, gelatin and acacia. Additionally, lubricating agents such as magnesium stearate, sodium lauryl sulfate and talc are often very useful for tabletting purposes. Solid compositions of a similar type may also be employed as fillers in soft and hard-filled gelatin capsules; preferred materials in this connection would also include lactose or milk sugar as well as high molecular weight polyethylene glycols.

For purposes of parenteral administration, solutions of these compositions in pharmaceutically acceptable liquid media are employed. Examples of these media include sesame or peanut oil or in aqueous propylene glycol or N,N - dimethylformamide may be employed, as well as sterile aqueous solutions of the corresponding water-soluble, non-toxic alkali and organic amine addition salts. Such aqueous solutions should be suitably buffered if necessary and the liquid diluent first rendered isotonic with sufficient saline or glucose. These particular aqueous solutions are especially suitable for intravenous, intramuscular, subcutaneous and intraperitoneal injection purposes. In this connection, the sterile aqueous media employed are all readily obtainable by standard techniques well known to those skilled in the art.

A suppository dosage form may be, for example, of carbowax or glycerin and is prepared following the conventional techniques of the pharmaceutical chemist involving dissolving or suspending the active ingredients in water, adding the carbowax or glycerin, heating, pouring into molds and allowing to stand until congealed to give the desired end product.

To prepare a tampon dosage form the active ingredients are dissolved or suspended in a small volume of water, from about 1 to 19 ml., and absorbed into a cylinder of cellulose or hydrophilic polyurethane foam. The water is then evaporated in vacuo or freeze dried to give the impregnated tampon. Cellulose tampons are well known in the art. Conventional polyurethane foams are the reaction product of liquid polyols (polyether or polyester) and a difunctional isocyanate, usually toluene diisocyanate. A catalyst such as tin, an amine, a flowing agent, generally water, and foaming stabilizers are also employed. The required cylinders for tampon use are cut from the prepared foam.

When an aerosol formulation is desired, the propellant may be any of the conventional propellants used in aerosol formulations, for example halogenated hydrocarbons of the fluorohydrocarbon or fluorohalohydrocarbon type such as trichloromonofluormethane, dichlorodifluoromethane, dichlorotetrafluoroethane, monochlorotrifluormethane, monochlorodifluoromethane and mixtures of any of these together or with other propellants. Typical of suitable propellants are those disclosed in, for example, U.S. Pat. 2,868,691 and sold under the trademark Freon.

It will be appreciated that the various components of the composition of the invention should desirably be substantially anhydrous, that is that the minimum feasible amount of water should be present.

In some cases it may be desirable to add a polar solvent to the formulation; suitable polar solvents for this purpose include ethyl alcohol and isopropyl alcohol.

It may also be desired to add auxiliary solids to the formulation. Thus where the medicament is of density considerably less than that of the propellants, it may be suitable to add a solid inert diluent of high density of the same particle size, so that the density of the combined solids is similar to that of the propellants. Suitable inert solids for this purpose include sodium chloride and sodium sulphate.

The various compositions of the present invention are conveniently prepared according to any conventional aerosol packing procedure. The individual ingredients may be premixed before addition to the aerosol containers, or the various constituents may be separately introduced into the containers by conventional cold fill or pressure methods. In operation, the composition is confined within the aerosol container at the vapor pressure of the propellant and on opening the spray dispensing valve, which may be of any conventional construction, the pressure is released to produce a fine ointment mist of the desired characteristics. A substantially uniform and reproducible layer of the ointment base and medicaments may be readily applied to an injured or infected body area in this manner. The resultant film is air pervious in order to provide a breathing covering which permits access of air and oxygen to the affected area thereby improving the healing characteristics. Further an ointment film produced in this manner is found to simultaneously permit extremely fast release of the pharmaceutically active ingredient to the body area being treated.

In packing the pressurized aerosol containers, the metallic shell, the spray dispensing head and the constituents of the composition may be presterilized or handled in any medically accepted manner. The aerosol container may then be filled and maintained at a relatively cool temperature while cold propellant is added following which the container may be closed while maintained at the low temperature. Other filling cycles may be used such as mixing the ointment and the propellant and cold filling, or the composition may be pressure-filled at higher temperatures. Various such methods of packing are conventional and the present compositions may be handled by any of the known procedures thus being readily adapted for use with any of the equipment currently available. Preferably, the materials are sufficiently intermixed prior to, or during the filling procedure that substantially uniform solution is produced thereby precluding any settling or valve clogging problems in subsequent use of the aerosol dispenser.

The examples to follow are illustrative and in no way limit the scope of the appended claims. All temperatures are given in degrees Centigrade and percentages are by weight.

PREPARATION A₁

To a solution cooled to 0° of 5.98 g. (30.0 mmoles) of 5-bromovaleric acid chloride (Aldrich) in 30.0 ml. of dry dimethoxyethane was added over a period of 30 minutes a solution of 5.32 g. (90.0 mmoles) of acetamide (Baker) and 3.62 ml. (45.0 mmoles) of dry pyridine in 70 ml. of dry dimethoxyethane. The heterogeneous mixture was stirred for an additional 1.0 hour at 0° under nitrogen then was concentrated by rotary evaporation. The resultant mixture was diluted with ether. The ethereal solution was washed with 10% aqueous hydrochloric acid (3x) and with saturated brine (1x), was dried (anhydrous magnesium sulfate), and was concentrated to afford a yellow oil weighing 5.0 g. The crude yellow oil was purified by chromatography on silica gel (Baker "Analyzed" Reagent; 60–200 mesh) using first benzene to elute a less polar biproduct. Elution with a 1:1 mixture of benzene:methylene chloride afforded a yellow solid which was recrystallized from methylene chloride:hexane to afford the colorless, solid N-acetyl-5-bromovaleramide weighing 1.04 g. (16.5% yield) melting at 90.5–91.0°.

The ir spectrum (CHCl₃) of the product exhibited absorption bands at 5.72μ (moderately strong) 5.80μ (strong) attributable to the carbonyl groups. The nmr spectrum (CHCl₃) showed a triplet centered at 3.46δ (J=6 c.p.s.) for BrCH₂—, a triplet centered at 2.63δ (J=6 c.p.s.) for

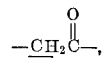

a singlet at 2.36δ for

a multiplet at 1.67–2.17δ for —CH₂—CH₂—, and a broad singlet at 9.00–9.58δ for —N—H.

A solution of 1.00 g. (4.77 mmoles) of the N-acetyl-5-bromovaleramide thus prepared, 1.25 g. (4.77 mmoles) of triphenylphosphine (Baker) and 35 ml. of acetonitrile was heated at reflux under nitrogen for 48 hours. The reaction was then concentrated by rotary evaporation and the resultant semisolid was triturated with ether (3x). The resultant white solid was recrystallized from 2-propanol:ether to afford the desired [4-(acetylaminocarbonyl)butyl]-triphenylphosponium bromide as colorless cubes weighing 2.09 g. (91.0% yield) and melting at 161–163°.

The IR spectrum (CHCl₃) of the product exhibited absorption bands at 5.72μ (moderately strong) and 5.80μ (strong) attributable to the carbonyl groups. The nmr spectrum (CHCl₃) exhibited a multiplet at 3.42–3.98δ for the P—CH₂—, a multiplet at 2.44–2.96δ for the

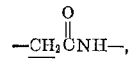

a single at 2.23δ for the

a multiplet at 1.48–2.13 for the CH₂CH₂, and a multiplet at 7.60–8.14δ for the aromatic protons.

The above product may be caused to react with the known 2-[5α-hydroxy-3α-(tetrahydropyran-2-yloxy)-2β-3α - tetrahydropyran - 2 - yloxy) - trans - 1 - cis - 5-octadium - 1 - yl)cyclopent - 1α - yl/acetaldehyde, γ-hemiacetal (E. J. Corey, et al., J. Am. Chem. Soc. 93, 1490 (1971)) to produce N-acetyl 9-hydroxy-11α,15α-bis - (tetrahydropyran - 2 - yloxy) - cis - 5 - trans - 13-cis-17-prostatrienamide which may be converted by known reactions (E. J. Corey, ibid) into the N-acetyl prostaglandin E₃ carboxamide.

PREPARATION A₂

To a solution of 1.21 g. (2.50 mmoles) of the [4 (Acetylaminocarbonyl)butyl]triphenylphosphonium bromide in 3.0 ml. of dry dimethyl sulfoxide was added dropwise 2.20 ml. (4.95 mmoles) of a 2.25 M. solution of sodium methylsulfinylmethide in dimethyl sulfoxide. To this red ylide solution was added dropwise a solution of 438 mg. (1.00 mole) of 2-[5α-hydroxy-3α-(tetrahydropyran - 2 - yloxy) - 2β - (3α - (tetrahydropyran - 2-yloxy) - trans - 1 - octen - 1 - yl)cyclopent - 1α - yl] acetaldehyde, γ-hemiacetal in 2.0 ml. of dry dimethyl sulfoxide over a period of 0.5 hour. After being stirred for 20 hours at room temperature the reaction was poured onto ice water. The aqueous solution was covered with ether and the vigorously stirred mixture was acidified to pH 3 by the addition of 10% aqueous hydrochloric acid. The acidified aqueous layer was further extracted with ether (2×). The combined ethereal extracts were dried (anhydrous magnesium sulfate) and were concentrated to afford a semisolid weighing 437 mg. This semisolid was purified by column chromatography on silica gel (Baker "Analyzed" Reagent 60–2000 mesh) using a 4:1 mixture of benzene:ethyl acetate as eluent. After removal of high R_f impurities, 362 mg. (82.5% recovery) of starting 2 - [5α - hydroxy - 3α - (tetrahydropyran - 2 - yloxy)-2β - (3α - (tetrahydropyran - 2 - yloxy) - trans - 1 - octen- 1-yl)cyclopent-1α-yl]acetaldehyde, γ-hemiacetal and 76 mg. (77.6% yield based on unrecovered starting material) of N-acetyl-9α-hydroxy-11,15α-bis-(tetrahydropyran-2-yloxy)-cis-5-trans-13-prostadienamide were collected.

The ir spectrum (CHCl₃) of the product exhibited a strong absorption at 5.80μ (carbonyls). The NMR spectrum (CDCl₃) exhibited a multiplet at 5.27–5.68δ for the olefinic protons, a brad singlet at 4.60–4.80δ for OH the NH, multiplets at 3.25–4.30δ for —CHO and —CH₂O—, a singlet at 2.37δ for the —COCH₃, and multiplets at 0.68–2.37δ for the remaining protons.

PREPARATION A₃

To a solution cooled to —20° under nitrogen of 134 mg. (0.238 mmole) of the N-acetyl-9α-hydroxy-11α,15α-bis-(tetrahydropyran - 2 - yloxy) - cis - 5 - trans - 13 - prostadienamide prepared in Preparation A₂ above in 4 ml. of reagent grade acetone was added dropwise 0.080 ml. (0.213 mmoles) of Jones' reagent. After 15 minutes the reaction was quenched by the addition of 0.080 ml. of isopropanol. The mixture was stirred in the cold for 10 minutes then was diluted with ethyl acetate. The organic layer was washed with water (2×) and saturated brine (1×), was dried (anhydrous magnesium sulfate), and was concentrated to afford an oil weighing 116 mg. The oil was purified by chromatography on silica gel (Baker "Analysed" Reagent 60–200 mesh) using benzene then chloroform as eluents. After elution of higher $R_f$ impurities the oily N-acetyl-9-oxo-11α, 15α-bis-(tetrahydropyran-2-yloxy)-cis-5-trans-13-prostadienamide was collected weighing 63 mg. (47.0% yield).

The IR spectrum (CHCl₃) of the product exhibited a strong absorption at 5.67μ (ketone carbonyl) and 5.95μ (imide carbonyls).

A solution of the above starting material (108 mg.; 0.192 mmole) in 2 ml. of a 65:35 mixture of acetic acid:water was heated at 42° for 4 hours. After concentration the resultant oily product was purified by silica gel chromatography (Silicar CC-4). After removal of high $R_f$ impurities with chloroform, elution with a 9:1 mixture of methylene chloride:methanol afforded the desired N-acetyl - 9α,11α,15α - trihydroxy - cis - 5 - trans - prostadienamide, the N-acetyl prostaglandin F₂α carboxamide as a viscous, colorless oil weighing 42 mgs.

The NMR spectrum of the product exhibited a multiplet at 5.65–5.22δ for the olefinic protons, a multiplet at 4.32–3.79δ for the CHO, a singlet at 2.40δ for the COCH₃, and multiplets at 2.73–0.71δ for the remaining protons.

PREPARATION A₄

A solution of 63 mg. (0.112 mmole) of the N-acetyl-9-oxo-11α, 15α-bis-(tetrahydropyran-2-yloxy)-cis-5-trans-13-prostadienamide of Preparation A₃ in 2.0 ml. of a 65:35 mixture of acetic acid:water was stirred under nitrogen at 40° for 5 hours then was concentrated by rotary evaporation. The resultant crude oil was purified by column chromatography on silica gel (SilicAR CC-4) using ethyl acetate as eluent. After elution of loss polar impurities the semisolid N-acetyl-9-oxo-11α,15α-dihydroxy-cis-5-trans-13-prostadienamide, the N-acetyl prostaglandin E₂ carboxamide, was collected weighing 27 mg. (61.4% yield). The semisolid was recrystallized from hexane:methylene chloride:acetone as fine needles melting at 87.0–88.0° C.

The IR spectrum (CHCl₃) of the product exhibited strong absorptions at 5.78μ (ketone carbonyl) and 5.92μ (Imide carbonyls). The nmr spectrum (DDCl₃) of the product exhibited two multiplets at 5.26–5.72δ for the olefinic protons, a multiplet at 3.85–4.28δ for the —CHO, a singlet at 2.35δ for the —COCH₃, and multiplets at 0.68–2.82δ for the remaining protons.

PREPARATION B₁

A mixture of 5-bromovaleronitrile (16.2 g., 0.10 mole), triphenylphosphine (26.2 g., 0.10 mole) and toluene (100 ml.) was heated to reflux with stirring under nitrogen for 16 hours. The resulting thick white suspension was cooled to room temperature and filtered. The residue was washed with beznene and air dried to give 33.0 g. of a white, crystalline solid, m.p. 230–232°, which was 4-cyanobutyl-triphenylphosphonium bromide.

Anal.

Calc'd for C₂₃H₂₃BrNP: C, 65.10, H, 5.47; N, 3.30
Found: C, 65.01; H, 5.40; N, 3.19

A mixture of the phosphonium salt above (10.0 g., 23.5 mmoles), ammonium chloride (1.60 g., 30.0 mmoles), lithium chloride (0.032 g., 0.76 mmole), sodium azide (1.91 g., 29.3 mmoles), and dimethylformamide (50 ml.) was heated to 127° (oil bath) under nitrogen with stirring for 18 hours. The resulting suspension was cooled and filtered. The residue was washed with dimethyl-formamide and the combined filtrate and washings were concentrated (aspirator pressure, ca. 45°). The oily residue was crystallized from water at 0° and air dried to give a white crystalline solid (8.11 g.), m.p. 100–102°. The product was recrystallized from methanol-ether to give white prisms (7.18 g.), m.p. 197–206°. An analytical sample was prepared by recrystallization from 2-propanol to give a white crystalline powder, m.p. 212–213°, which was 4-(tetrazol-5-yl)butyltriphenylphosphonium bromide.

Anal.

Calc'd for C₂₃H₂₄H₄PBr: C, 59.10; H, 5.17; N, 11.99; P, 6.63; Br, 17.09.
Found: C, 59.35; H, 5.28; N, 12.31; P, 6.78; Br, 17.26.

PREPARATION B₂

Sodium hydride mineral oil dispersion (56.6%, 2.12 g., 1.20 g. dry powder) was washed with three portions of pentane under dry nitrogen. The resulting gray powder was stirred with dry dimethylsulfoxide (25 ml., distilled from CaH₂, bp ca. 60° at 6 mm.) under nitrogen at 60.65° for 2 hours to give a cloudy, gray solution. The solution was cooled, and an aliquot was diluted with water and was titrated to a phenolphthalein end point with 0.100N hydrochloric acid to determine a molarity of 2.07. A portion of the standardized solution (5.36 ml., 11.1 mmoles) was added dropwise over a 15 min. period to a stirred solution of the final phosphonium salt of Preparation of B₁ (2.70 g., 578 mmoles) in dry dimethylsulfoxide (8 ml.) under nitrogen at room temperature. To the resulting red solution was added a solution of 2-[5α-hydroxy - 3α - (tetrahydropyran-2-yloxy)-2β-(3α-tetrahydropyran-2-yloxy)-trans-1-octen - 1 - yl)cyclopent-1α-yl]acetaldehyde, γ-hemiacetal [known compound, see E. J. Corey, et al., J. Am. Chem. Soc. 92, 397 (1970), 1.00 g., 2.28 mmoles] in dimethylsulfoxide (6 ml.) over a 50 min. period while stirring for an additional 2½ hours and then was poured into ice-water (100 ml.). The aqueous mixture was acidified with 1.0N hydrochloric acid (11.8 ml.) and extracted with three 50-ml. portions of ethyl acetate. The extract was washed with water (20 ml.), dried (MgSO₄), and concentrated (aspirator pressure, ca. 40°) to give a red oil (2.51 g.). The crude oil was chromatographed on 60–200 mesh silica gel (50 g.) using chloroform, ethyl acetate and methanol as successive eluents to separate a mixture containing mostly triphenylphosphine oxide (1.05 g.) unchanged starting material (0.18 g., 18% recovery), the expected proudct, 3β-[3α-(tetrahydropyran-2-yloxy)-trans - 1 - octen-1-yl]-2α-[6-(tetrazol-5-yl)-cis - 2 - hexen - 1 - yl - 4α - tetrahydropyran-2-yloxy)cyclopentanol as a thick colorless oil (0.630 g., 50.5% yield), and a mixture of expected product and unidentified products (0.459 g.). The fractions were identified by thin layer chromatography on neutral silica gel glass plates using ethyl acetate or chloroform-methanol (5:1) as developer and the chromatograms were visualized by heating with a vanillin-phosphoric acid reagent.

The expected product exhibited $R_f$ values of 0.22 and 0.72, respectively, with these two developing systems.

PREPARATION $B_3$

To a stirred solution of the *bis* THP ether of Preparation $B_2$ (400 mg., 0.731 mmoles) in acetone (12.3 ml.) at −10° was added, dropwise over a 5 minute period, 0.29 ml. of Jones reagent previously prepared from 2.67 g. chromium trioxide and 2.3 ml. concentrated sulfuric acid diluted to 10 ml. volume with water. The resulting mixture was aged for 15 minutes at −10° and then treated with isopropyl alcohol (0.46 ml.). The mixture was stirred for an additional 5 minutes at −10° and partitioned between ehtyl acetate (30 ml.) and water (30 ml.). The ethyl acetate layer was separated and combined with an ethyl acetate extract of the aqueous layer. The combined solutions were washed with three 15-ml. portions of water, dried ($MgSO_4$), and concentrated (aspirator pressure, *ca.* 40–50°) leaving 358 mg. of 4α-(tetrahydropyran-2-yloxy)-3β[3α-(tetrahydropyran-2-yloxy)-*trans*-1 - octen - 1 - yl]-2α-[6-(tetrazol-5-yl)-*cis*-2-hexen-1-yl/cyclopentanone as a viscous oil.

PREPARATION $B_4$

The oil produced in Preparation $B_3$ was stirred with acetic acid (10.7 ml.) and water (5.8 ml.) under nitrogen at 40–45° for 3 hours. The resulting solution was concentrated (aspirator pressure, *ca.* 40–50°) and the residue (275 mg.) was chromatographed on acidic silica gel (25 g., Malinckrodt Silicar CC–4, 100–200 mesh) using mixtures of chloroform and methanol as the eluent to separate an unidentified mixture (130 mg.) and the desired product 4α-hydroxy-3β-(3α-hydroxy-*trans*-1 - octen-1-yl)-2α-[6-(tetrazol-5-yl)-*cis*-2-hexen - 1 - yl] cyclopentanone, as a clear, thick, colorless oil (103 mg., 37%). Thin layer chromatography of the product on silica gel glass plates using methylene chloride-methanol (9:1) or benzene-tetrahydrofuran-formic acid (15:5:2) as the developers and visualizing the chromatograms by heating with vanillin-phosphoric acid reagent showed a single spot with $R_f$ values of 0.30 and 0.25 on the two systems, respectively. The IR spectrum ($CHCl_3$) of the product exhibited a strong absorption band at 1730 cm.$^{-1}$ (C=O) and a moderately weak band at 3610 cm.$^{-1}$ (OH). The UV spectrum (95% EtOH) of the product showed only end absorption. This product is 2-descarboxy-2-(tetrazol-5-yl)$PGE_2$. Treatment of a small sample of the product with 10% aqueous sodium hydroxide and ethanol for 15 minutes at room temperature give a single product by tlc (Rf 0.38, silica gel, benzene-tetrahydrofuran-formic acid, 15:5:2). The UV spectrum (95% EtOH) of the latter product exhibited an absorption maximum at 270 m$\mu$ (19,600).

PREPARATION $C_1$

A solution of 12.4 g. (100 mmoles) dimethyl methylphosphonate (Aldrich) in 125 ml. dry tetrahydrofuran was cooled to −78° in a dry nitrogen atmosphere. To the stirred phosphonate soultion was added 45 ml. of 2.37 $M$ $n$-butyllithium in hexane solution dropwise over a period of 30 minutes at such a rate that the reaction temperature never rose above −65°. After an additional 5 minutes stirring at −78°, 6.6 g. (50.0 mmole) methyl 4-methoxybutyrate [prepared by the method of R. Huisgen and J. Reinertshafter, *Am. 575,* 197 (1952)] was added dropwise at a rate that kept the reaction temperature less than −70° (10 minutes). After 3 hours at −78° the reaction mixture was allowed to warm to ambient temperature, neutralized with 6 ml. acetic acid and rotary evaporated to a white gel. The gelatinous material was taken up in 25 ml. water, the aqueous phase extracted with 100 ml. portions of methylene chloride (3×), the combined organic extracts dried ($MgSO_4$), and concentrated (water aspirator) to a crude residue and distilled, b.p. 141–145° (1.7–0.6 mm.) to give 7.6 g. (68%) dimethyl 2-oxo-6-oxaheptylphosphonate.

Vapor phase chromatography analysis (a 5′ x ¼″ column containing 10% SE 30 on Chromosorb P, 80–100 mesh at 105° was employed) indicated a purity≥99.9%. The NMR spectrum ($CDCl_3$) showed a doublet centered at 3.78δ (J=11.5 C.P.S. 6H) for

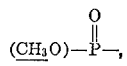

a triplet centered at 3.37δ (2H) for

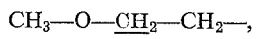

a singlet at 3.28δ (3H) for

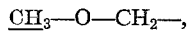

a double centered at 3.14δ (J=23 C.P.S., 2H)

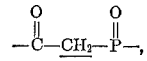

a triplet centered at 2.71δ (2H) for

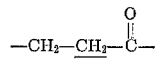

and a multiplet 1.57–2.10δ (2H) for

PREPARATION $C_2$

Dimethyl 2-oxo-6-oxaheptylphosphonate as prepared in Preparation $C_1$ (1.68 g., 7.5 mmole), in 125 ml. anhydrous ether was treated with 2.5 ml. (5.9 mmole) 2.37$M$ $n$-butyllithium in $n$-hexane in a dry nitrogen atmosphere at room temperature. After 5 minutes of stirring, an additional 225 ml. of anhydrous ether was added followed by 1.75 g. (5.0 mmole) 2-[3α-$p$-phenylbenzoyloxy-5α-hydroxy-2β-formylcyclopentan-1α-yl]acetic acid, γ-lactone in one portion. After 30 minutes the reaction mixture was quenched with 2.5 ml. glacial acetic acid, diluted with 200 ml. anhydrous ether, washed with 200 ml. 10% HCl (2×), 200 ml. saturated sodium bicarbonate solution (1×), 100 ml. water (1×), dried ($MgSO_4$) and evaporated to yield 1.972 g. (88%) 2-[3α-p-phenylbenzoyloxy-5α-hydroxy-2β-(3-oxo - 7 - oxa-*trans*-1-octen-1-yl)cyclopent-1α-yl]acetic acid, γ-lactone as an oil.

The IR spectrum ($CHCl_3$) of the product exhibited adsorption bands at 1770 cm.$^{-1}$ (strong), 1717 cm.$^{-1}$ (strong) 1675 cm.$^{-1}$ (medium) and 1630 cm.$^{-1}$ (medium) attributable to the carbonyl groups. The UV spectrum had a $\lambda_{max.}$=274 m$\mu$ and $\epsilon_{max.}$=21.380 (ethanol solution). The NMR spectrum ($CDCl_3$) exhibited a multiplet at 7.23–8.18δ (9H) for the $p$-biphenyl group, a doublet of doublets centered at 6.71δ (1H, J=7.16 C.P.S.) and a doublet centered at 6.27δ (1H, J=16 C.P.S.) for the olefinic protons, a triplet at 3.30δ (2H) for —$CH_2$—$\underline{CH_2}$—O—$CH_3$, a singlet at 3.21δ (3H) for —$CH_2$—O—$\underline{CH_3}$, and multiplets at 4.90–5.50δ (2H), 2.21–307δ (8H) and 1.58–2.6δ for the remainder of the protons.

PREPARATION $C_3$

To a solution of 1972 mg. (4.4 mmole) 2-[3α-$p$-phenylbenzoyloxy-5α-hydroxy-2β-(3-oxo - 7 - oxa-*trans*-1-octen-1-yl)cyclopent-1α-yl]acetic acid, γ-lactone as prepared in Preparation $C_2$ in 15 ml. dry 1,2-dimethoxyethane in a dry nitrogen atmosphere at ambient temperature was added dropwise 4.0 ml. of a 0.5 $M$ zinc borohydride solution. After stirring at room temperature for 1 hour, the reaction mixture was cooled to 0° and a saturated sodium bitartrate solution was added dropwise until hydrogen evolution ceased. The reaction mixture was allowed to stir for 5 minutes at which time 250 ml. dry methylene chloride was added. After drying ($MgSO_4$) and concentrating (water aspirator) the resultant semi-solid was purified by column chromatography on silica gel (Baker "Analyzed" Reagent 60–200 mesh) using ether as eluent. After elution of less polar impurities, fractions containing 450 mg. 2-[3α-p-phenylbenzoyloxy-5α-hydroxy-2β-(3α-hydroxy - 7 - oxa-*trans*-1-octen-1-yl) cyclopent-1α-yl]acetic acid, γ-lactone, and 486 mg. of the two mixed were eluted.

The IR spectrum (CHCl₃) of the first of these two compounds had strong carbonyl adsorptions at 1770 and 1715 cm.⁻¹.

PREPARATION C₄

A heterogeneous mixture of 450 mg. (1.0 mmole) of 2-[3α-phenylbenzoyl-oxy - 5α - hydroxy-2β-(3α-hydroxy-7-oxa-*trans*-1-octen-1-yl)cyclopent-1α-yl]acetic acid, γ-lactone as prepared in Preparation C₃, 4.5 ml. of absolute methanol and 140 mg. of finely powdered, anhydrous potassium carbonate was stirred at room temperature for one hour, then cooled to 0°. To the cooled solution was added 2.0 ml. (2.0 mmole) of 1.0*N* aqueous hydrochloric acid. After stirring at 0° for an additional 10 minutes, 5 ml. of water was added with concomitant formation of methyl p-phenylbenzoate which was collected by filtration. The filtrate was saturated with solid sodium chloride, extracted with ethyl acetate (4× 10 ml.), the combined organic extracts were washed with saturated sodium bicarbonate (10 ml.), dried (MgSO₄) and concentrated to give 204 mg. (75%) of viscous, oily 2-[3α,5α-dihydroxy-2β-(3α-hydroxy - 7 - oxa-*trans*-1-octen-1-yl) cyclopent-1α-yl]acetic acid, γ-lactone.

The IR spectrum (CHCl₃) exhibited a strong adsorption at 1770 cm.⁻¹ for the lactone carbonyl and medium adsorption at 960 cm.⁻¹ for the *trans*-double bond.

PREPARATION C₅

To a solution of 192 mg. (0.71 mmole) 2-[3α,5α-dihydroxy-2β-(3α-hydroxy - 7 - oxa-*trans*-1-octen-yl)cyclopent-1α-yl]acetic acid, γ-lactone as prepared in Preparation C₄, in 5 ml. anhydrous methylene chloride and 1 ml. of 2,3-dihydropyran at 0° in a dry nitrogen atmosphere was added 5 mg. p-toluenesulfonic acid, monohydrate. After stirring for 15 minutes, the reaction mixture was combined with 100 ml. ether, the ether solution washed with saturated sodium bicarbonate (1× 15 ml.) then saturated brine (1× 15 ml.), dried (MgSO₄) and concentrated yield 310 mg. (100%) 2-[5α-hydroxy-3α-(tetrahydropyran-2-yloxy) - 2β - (3α-[tetrahydropyran-2-yloxy]-7-oxa-*trans*-1-octen-1-yl)cyclopent-1α-yl]acetic acid, γ-lactone.

The NMR spectrum (DDCl₃) exhibited a multiplet at 5.30–5.62δ (2H) for the olefinic protons, a singlet at 3.34δ (3H) for the methyl ether protons, and multiplets at 4.36–5.18δ (4H), 3.22–4.24δ (9H), and 1.18–2.92δ (20H) for the remaining protons.

PREPARATION C₆

A solution of 310 mg. (0.71 mmole) 2-[5α-hydroxy-3α-(tetrahydropyran - 2 - yloxy)-2β-3α-[tetrahydropyran-2-yloxy]-7-oxa-*trans*-1-octen-1-yl)cyclopent-1α-yl, acetic acid, γ-lactone as prepared in Preparation C₅ in 5 ml. dry toluene was cooled to −78° in a dry nitrogen atmosphere. To this cooled solution was added 1.5 ml. of 20% diisobutylaluminum hydride in n-hexane dropwise at such a rate so that the internal temperature never rose above −65° (15 minutes). After an additional 45 minutes of stirring at −78°, anhydrous methanol was added until gas evolution ceased and the reaction mixture was allowed to warm to room temperature. The reaction mixture was combined with 100 ml. ether, washed with 50% sodium potassium tartrate solution (4× 20 ml.), dried (MgSO₄) and concentrated to yield 290 mg. (93%) 2-[5α-hydroxy-3α-(tetrahydropyran - 2 - yloxy]-7-oxa-*trans*-1-octen-1-yl)cyclopent-1-yl] acetaldehyde, γ-hemiacetal.

PREPARATION C₇

To a solution of 870 mg. (2.0 mmole) (4-carbohydroxy-*n*-butyl) triphenylphosphonium bromide in a dry nitrogen atmosphere in 5.0 ml. dry dimethyl sulfoxide was added 2.0 ml. (4.4 mmole) of a 2.2*M* solution of sodium methylsulfinylmethide in dimethyl sulfoxide. To this red ylide solution was added dropwise a solution of 290 mg. (0.66 mmole) 2-[5α-hydroxy-3α-(tetrahydropyran-2-yloxy) - 2β - (3α-[tetrahydropyran-2-yloxy]-7-oxa-*trans*-1-octen-1-yl)cyclopent-1α-yl] acetaldehyde, γ-hemiacetal as prepared in Preparation C₆ in 3.0 ml. dry dimethyl sulfoxide over a period of 20 minutes. After an additional 2 hours stirring at room temperature, the reaction mixture was poured onto ice water. The basic aqueous solution was washed twice with ethyl acetate (20 ml.) and acidified to pH ∼3 with 10% aqueous hydrochloric acid. The acidic solution was extracted with ethyl acetate (3× 20 ml.) and the combined organic extracts washed once with water (10 ml.), dried (MgSO₄) and evaporated to a solid residue weighing 784 mg. This solid residue was triturated with ethyl acetate and filtered. The filtrate was purified by column chromatography on silica gel (Baker "Analyzed" Reagent 60–200 mesh) using ethyl acetate as eluent. After removal of high R_f impurities, 225 mg. (66%) of 9α-hydroxy-11α, 15α-*bis*-(tetrahydropyran-2-yloxy)-19-oxa - *cis*-5-trans-13-prostadienoic acid was collected.

The NMR spectrum (CDCl₃) exihited a multiplet (variable) at 5.84–6.38δ (2H) for the —OH protons, a multiplet at 5.27–5.68δ (4H) for the olefinic protons, a multiplet at 4.52–4.84δ (2H) for the acetal protons, a singlet at 3.34δ (3H) for the methyl ether protons and multiplets at 3.25–4.35δ (9H) and 1.20–2.72δ (28H) for the remaining protons.

PREPARATION C₈

To a solution cooled to −10° under nitrogen of 190 mg. (0.356 mmole) 9α-hydroxy-11α,15α-*bis*-(tetrahydropyran-2-yloxy)-19-oxa-*cis*-5-*trans*-13-prostadienoic acid as prepared in Preparation C₇, in 5 ml. reagent grade acetone was added dropwise 0.143 ml. (0.356 mmole) of Jones' reagent. After 20 minutes at −10°, 0.140 ml. 2-propanol was added and the reaction mixture was allowed to stir an additional 5 minutes at which time it was combined with 40 ml. ethyl acetate, washed with water (3×15 ml.), dried (MgSO₄) and concentrated to give 174 mg. of 9-oxo-11α,15α-*bis*-(tetrahydropyran-2-yloxy) - 19-oxa-*cis*-5-*trans*-13-prostadienoic acid.

PREPARATION C₉

A solution of 174 mg. (0.334 mmole) 9-oxo-11α,15α-*bis*-tetrahydropyran - 2 - yloxy) - 19 - oxa-*cis*-5-*trans* - 13-prostadienoic acid as prepared in Preparation C₈ in 3.0 ml. of a 65:35 mixture of glacial acetic acid:water was stirred under nitrogen at 40° for 5 hours then was concentrated by rotary evaporation. The resultant crude oil was purified by column chromatography on silica gel (Mallinckrodt CC-4 100–200 mesh) using ethyl acetate as eluent. After elution of less polar impurities the semisolid 9-oxo-11α,15α-dihydroxy - 19-oxa-*cis*-5-*trans*-13-prostadienoic acid weighing 33 mg. was collected. This product is 19-oxaprostaglandin E₂, M.P. 58–9° (ethyl acetate, cyclohexane).

*Analysis:*
  Calc'd for C—64.39; H—8.53
  Found: C—64.30; H—8.28
  [α]_D²⁵=−71.2° (C=1.0, methanol)

The IR spectrum (CHCl₃) of the product exhibited a strong adsorption at 1715 cm.⁻¹ for the carbonyls and a medium band at 965 cm.⁻¹ for the *trans* double bond. The UV spectrum in methanol wth added potassiumhydroxide solution exhibited a λ_max 278 mμ and an ε_max 28,000.

PREPARATION D₁

*Dimethyl 2-Oxo-3-phenylpropylphosphonate (2a)*

A solution of 6.2 g. (50 mmoles) dimethyl methylphosphonate (Aldrich) in 125 ml. dry tetrahydrofuran was cooled to −78° in a dry nitrogen atmosphere. To the stirred phosphonate solution was added 21 ml. of 2.37

M n-butyllithium in hexane solution (Alfa Inorganics, Inc.) dropwise over a period of 18 minutes at such a rate that the reaction temperature never rose above −65°. After an additional 5 minutes stirring at −78°, 7.5 g. (50.0 mmole) methyl phenylacetate was added dropwise at a rate that kept the reaction temperature less than −70° (20 minutes). After 3.5 hours at −78°, the reaction mixture was allowed to warm to ambient temperature, neutralized with 6 ml. acetic acid and rotary evaporated (water aspirator) to a white gel. The gelatinous material was taken up in 75 ml. water, the aqueous phase extracted with 100 ml. portions of chloroform (3×), the combined organic extracts were backwashed (50 cc. H₂O), dried (MgSO₄), and concentrated (water aspirator) to a crude residue and distilled, b.p. 134–5° (<0.1 mm.) to give 3.5 g. (29% dimethyl 2-oxo-phenylpropyl-phosphonate.

The NMR spectrum (CDCl₃) showed a doublet centered at 3.72δ (J=11.5 cps., 6H) for

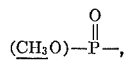

a doublet centered at 3.14δ (J=23 cps., 2 H)

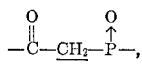

a singlet at 3.88δ (2H) for

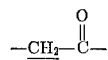

and a broad singlet at 7.22δ (5H) for C₆H₅—.

PREPARATION D₂

2 - [3α - n - Phenylbenzoyloxy - 5α - hydroxy-2β-(3-oxo-4-phenyl-*trans*-1-buten-1-yl) cyclopent-1α-yl]acetic acid, γ-lactone Method A: Dimethyl 2-oxo-3-phenylpropylphosphonate (3.4 g., 14.2 mmole) in 200 ml. anhydrous ether was treated with 5.0 ml. (12.5 mmole) 2.5 M n-butyllithium in n-hexane (Alfa Inorganics, Inc.) in a dry nitrogen atmosphere at room temperature. After 5 min. of stirring, an additional 400 ml. of anhydrous ether was added followed by 3.85 g. (11 mmole) 2-[3α-p-phenylbenzoyloxy-5α-hydroxy-2β-formylcyclopentan-1α-yl]acetic acid, γ-lactone in one portion and 50 ml. anhydrous ether. After 35 minutes the reaction mixture was quenched with 5 ml. glacial acetic acid, washed with 100 ml. saturated sodium bicarbonate solution (4×), 100 ml. water (2×), 100 ml. saturated brine (1×), dried (MgSO₄) and evaporated to yield 2.908 g. (57%) 2-[3α-p-phenylbenzoyloxy-5α-hydroxy - 2β - (3-oxo-4-phenyl-*trans*-1-buten-1-yl)cyclopent-1α-yl]acetic acid, γ-lactone as a foam after column chromatography (silica gel, Baker, 60–200 mesh).

Method B: Dimethyl 2-oxo-3-phenylpropylphosphonate (2a) (2.9 g., 12 mmole) in 20 ml. anhydrous dimethoxyethane was treated with 4.7 ml. (11 mmole) 2.34 M n-butyllithium in n-hexane (Alfa Inorganics, Inc.) in a dry nitrogen atmosphere at room temperature. After 40 min. of stirring, 3.5 g. (10 mmole) 2-[3α-p-phenylbenzoyloxy-5α-hydroxy-2β - formylcyclopentan-1α-yl]acetic acid, γ-lactone was added in one portion followed by 15 ml. anhydrous 1,2-dimethoxy ethane. After 30 minutes the reaction mixture was quenched with 1 ml. glacial acetic acid, filtered, washed wth 20 ml. saturated brine (1×), bonate solution (2×), 20 ml. saturated brine (1×), dried (Na₂SO₄) and evaporated to yield 2 g. (43%) 2-[3α-p-phenylbenxoyloxy-5α - hydroxy-2β-(3-oxo-4-phenyl-*trans*-1-buten-1-yl)cyclopent-1α-yl]acetic acid, γ-lactone as a foam after column chromatography silica gel (Baker, 60–200 mesh).

The IR spectrum (CHCl₃) of the product (3a) exhibited adsorption bands at 1775 cm.⁻¹ (strong), 1715 cm.⁻¹ (strong), 1675 cm.⁻¹ (medium and 1630 cm.⁻¹ (medium) attributable to the carbonyl groups and at 973 cm.⁻¹ for the *trans* double bond. The NMR spectrum (CDCl₃) exhibited a multiplet at 7.23–8.18δ (9H) for the p-biphenyl group, a doublet of doublets centered at 6.75δ (1H, J=16 cps.) and a doublet centered at 6.27δ (1H, J=16 cps.) for the olefinic protons, a broad singlet at 7.20δ (5H) for

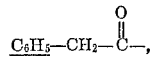

a singlet at 3.84δ (2H) for

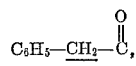

and multiplets at 4.90–5.50δ (2H) and 2.21–3.07δ (6H) for the remainder of the protons.

PREPARATION D₃

2-[3α-p-Phenylbenzolyoxy-5α-hydroxy-2β-(3α - hydroxy-4-phenyl-*trans*-1-buten-1-yl)cyclopent-1α-yl]acetic acid, γ-lactone and 2-[3α-p-Phenylbenzoyloxy-5α-hydroxy-2β (3β-hydroxy-4-phenyl-*trans*-1-buten-1-yl)cyclopent - 1α-yl]acetic acid γ-lactone To a solution of 2908 mg. (6.2 mmole) 2-[3α-p-phenylbenzoyl-oxy-5α-hydroxy-2β-(3-oxo-4-phenyl - *trans* - 1-buten-1-yl)cynlopent-1α-yl]acetic acid, γ-lactone in 30 ml. dry 1,2-dimethoxyethane in a dry nitrogen atmosphere at ambient temperature was added dropwise 2.0 ml. of a 1.0 M zinc borohydride solution in 1,2-dimethoxyethane. After stirring at 0° for 2 hours, a saturated sodium bitartrate solution was added dropwise until hydrogen evolution ceased. The reaction mixture was allowed to stir for 5 minutes at which time 250 ml. dry methylene chloride was added. After drying (MgSO₄) and concentrating (water aspirator) the resultant semisolid was purified by column chromatography on silica gel (Baker "Analyzed" Reagent 60–200 mesh) using ether as eluent. After elution of less polar impurities a fraction containing 658 mg. 2-[3α-p-phenylbenzoyloxy-5α-hydroxy-2β-(3α-hydroxy - 4-phenyl-trans-1-buten-1-yl)cyclopent-1α-yl]acetic acid, γ-lactone, a 480 mg. fraction of mixed 4a and 5a and finally a fraction (671 mg.) of 2-[3α-p-phenylbenzoyloxy-5α-hydroxy-2β-(3β-hydroxy-4-phenyl-*trans* - 1 - buten-y1)cyclopent-1α-yl]acetic acid, γ-lactone.

The IR spectrum (CHCl₃) of 4a and 5a had strong carbonyl adsorptions at 1770 and 1715 cm.⁻¹ and an adsorption at 970 cm.⁻¹ for the *trans* double bond. The NMR spectrum (CDCl₃) of 4a and 5a was consistent with the assigned structure.

PREPARATION D₄

2-[3α,5α-Dihydroxy-2β-(3α-hydroxy-4 - phenyl - *trans* - 1-buten-1-yl)cyclopent-1α-yl]acetic acid, γ-lactone A heterogeneous mixture of 658 mg. (1.35 mmole) of 2-[3α-p-phenylbenzoyloxy-5α-hydroxy-2β-(3α-hydroxy - 4-phenyl-*trans*-1-buten-1-yl)cyclopenta-1α-yl]acetic acid, γ-lactone, 7.1 ml. of absolute methanol and 188 mg. of finely powdered, anhydrous potassium carbonate was stirred at room temperature for one hour, then cooled to 0°. To the cooled solution was added 2.8 ml. (2.8 mmole) of 1.0N aqueous hydrochloric acid. After stirring at 0° for an addition 10 minutes, 5 ml. of water was added with concomitant formation of methyl p-phenylbenzoate which was collected by filtration. The filtrate was saturated with solid sodium chloride, extracted with ethyl acetate (4× 10 ml.), the combined organic extracts were washed with saturated sodium bicarbonate (10 ml.), dried (MgSO₄) and concentrated to give 381 mg. of viscous, oily 2-[3α,5α-dihydroxy-2β-(3α-hydroxy-4-phenyl-*trans*-1-buten-1 - yl) cyclopent-1α-yl acetic acid, γ-lactone.

The IR spectrum (CHCl₃) exhibited a strong adsorption at 1770 cm.⁻¹ for the lactone carbonyl and medium adsorption at 965 cm.⁻¹ for the *trans*-double bond.

PREPARATION D₅

2-[5α-Hydroxy-3α-(tetrahydropyran-2-yloxy) - 2β - (3α-[tetrahydropyran-2-yloxy]-4-phenyl-*trans*-1 - buten - 1-yl)cyclopent-1α-yl]acetic acid, γ-lactone To a solution of 38 mg. (1.33 mmole) 2-[3α-,5α-dihydroxy-2β-(3α-hyroxy-4-phenyl-*trans*-1 - buten - yl)cyclopent-1α-yl]acetic acid, γ-lactone in 5 ml. anhydrous methylene chloride and 0.4 ml. of 2,3-dihydropyran at 0° in a dry nitrogen atmosphere was added 5 mg. p-toluenesulfonic acid monohydrate. After stirring for 15 minutes, the reaction mixture was combined with 100 ml. ether, the ether solution washed with saturated sodium bicarbonate (1× 15 ml.) then saturated brine (1× 15 ml.), dried (MgSO₄) and concentrated to yield 615 mg. (>100%) crude 2-[5α-hydroxy-3α-(tetrahydropyran-2-yloxy)-2β-(3α-[tetrahydropyran-2-yloxy]-4-phenyl - *trans*-1-buten-1-yl)cyclopent-1α-yl]acetic acid, γ-lactone.

PREPARATION D₆

2-[5α-Hydroxy-3α-(tetrahydropyran-2-yloxy) - 2β - (3α-[tetrahydropyran-2-yloxy]-4-phenyl-*trans* - 1 - buten - 1-yl)cyclopent-1α-yl]acetaldehyde, γ-hemiacetal A solution of 605 mg. (1.33 mmole) 2-[5α-hydroxy-3α-(tetrahydropyran-2-yloxy)-2β-3α-[tetrahydropyran-2 - yloxy]-4-phenyl-*trans*-1-buten-1-yl)cyclopent-1α - yl]acetic acid, γ-lactone in 8 ml. dry toluene was cooled to −78° in a dry nitrogen atmosphere. To this cooled solution was added 3.0 ml. of 20% diisobutylaluminum hydride in n-hexane (Alfa Inorganics) dropwise at such a rate so that the internal temperature never rose above −65° (15 minutes). After an additional 45 minutes of stirring at −78°, anhydrous methanol was added until gas evolution ceased and the reaction mixture was allowed to warm to room temperature. The reaction mixture was combined with 100 ml. ether, washed with 50% sodium potassium tartrate solution (4× 20 ml.), dried (Na₂SO₄) and concentrated to yield 615 mg. (100%) 2-[5α-hydroxy-3α-(tetrahydropyran-2-yloxy)-2β-(3α-[tetrahydropyran - 2 - yloxy) - 4-phenyl-*trans*-1-buten-1-yl)cyclopent-1-yl]acetaldehyde, γ-hemiacetal.

PREPARATION D₇

9α-Hydroxy-11α,15α-bis-(tetrahydropyran-2 - yloxy) - 16-phenyl-cis-5-*trans*-13-ω-tetranor prostadienoic acid To a solution of 1760 mg. (4.0 mmole) (4-carbohydroxy-*n*-butyl) triphenylphosphonium bromide in a dry nitrogen atmosphere in 5.0 ml. dry dimethyl sulfoxide was added 3.2 ml. (7.0 mmole) of a 2.2M solution of sodium methylsufinylmethide in dimethyl sulfoxide. To this red ylide solution was added dropwise a solution of 615 mg. (1.34 mmole) of 2-[5α-hydroxy-3α-(tetrahydropyran-2-yloxy)-2β-(3α-[tetrahydropyran-2-yloxy]-4-phenyl - *trans*-1-buten-1-yl)cyclopent-1α-yl]acetaldehyde, γ-hemiacetal in 5.0 ml. dry dimethyl sulfoxide over a period of 20 minutes. After an additional 2 hours stirring at room temperature, the reaction mixture was poured into ice water. The basic aqueous solution was washed twice with ethyl acetate (20 ml.) and acidified to pH₂₃ with 10% aqueous hydrochloric acid. The acidic solution was extracted with ethyl acetate (3× 20 ml.) and the combined organic extracts washed once with water (10 ml.), dried (MgSO₄) and evaporated to a solid residue. This solid residue was triturated with ethyl acetate and filtered. The filtrate was purified by column chromatography on silica gel (Baker "Analyzed" Reagent 60–200 mesh) using ethyl acetate as eluent. After removal of the high R_f impurities, 150 mg. of 9α-hydroxy-11α,15α-*bis*-(tetrahydropyran - 2 - yloxy) - 15-phenyl-*cis*-5-*trans*-13-ω-tetranor prostadienoic acid was collected.

PREPARATION D₈

9-Oxo-11α,15α-bis-(tetrahydropyran-2-yloxy)-16-phenyl-cis-5-*trans*-13-ω-tetranor prostadienoic acid To a solution cooled to −10° under nitrogen of 2300 mg. (4.24 mmole) 9α-hydroxy-11α,15α-*bis*-(tetrahydropyran-2-yloxy)-16-phenyl-*cis*-5-*trans*-13-ω - tetranor prostadienoic acid in 50 ml. reagent grade acetone was added dropwise to 11.3 ml. (29.6 mmole) of Jones' reagent. After 20 minutes at −10°, 10 ml. 2-propanol was added and the reaction mixture was allowed to stir an additional 5 minutes at which time it was combined with 300 ml. ethyl acetate, washed with water (3× 50 ml.), dried (MgSO₄) and concentrated to give 1983 mg. of 9-oxo-11α, 15α-*bis*-(tetrahydropyran-2-yloxy)-16-phenyl-*cis*-5 - *trans*-13-ω-tetranor prostadienoic acid.

PREPARATION D₉

9-Oxo-11α,15α-dihydroxy-16-phenyl-cis-5-*trans*-13-ω-tetranorprostadienoic acid

A solution of 1637 mg. (3.02 mmole) 9-oxo-11α,15α-*bis*-tetrahydropyran - 2 - yloxy)-16-phenyl-*cis*-5-*trans*-13-ω-tetranorprostadienoic acid in 20 ml. of a 65:35 mixture of glacial acetic acid:water was stirred under nitrogen at room temperature for 24 hours and then was concentrated by rotary evaporation. The resultant crude oil was purified by column chromatography on silica gel (Mallinckrodt CC-4 100–200 mesh) using ethyl acetate-cyclohexane as eluent. After elution of less polar impurities, the oily 9-oxo-11α,15α-dihydroxy-16-phenyl-*cis*-5-*trans*-13-ω-tetranor-prostadienoic acid weighing 365 mg. was collected.

PREPARATION E p-Biphenyl 9-oxo-11α,15α-dihydroxy-16-phenyl-cis-5-*trans*-3-ω-tetranorprostadienoate A solution of 200 mg. (0.535 mmole) 9-oxo-11α,15α-dihydroxy-16-phenyl-*cis*-5-*trans* - 13 - ω - tetranorprostadienoic acid of Preparation D₉, 900 mg. (5.3 mmoles) p-phenylphenol, 7 ml. of 0.097 M dicyclohexylcarbodiimide in methylene chloride and 20 ml. methylene chloride was stirred overnight at room temperature. Concentration (*in vacuo*) and column chromatography on silica gel (Baker, 60–200 mesh) using chloroform then ethyl acetate as eluents yielded 180 mg. of p-biphenyl 9-oxo-11α,15α-dihydroxy - 16 - phenyl-*cis*-5-*trans*-13-ω-tetranorprostadienoate, m.p. 120–121° (ether-pentane).

Using the above procedure, the *p*-biphenyl esters of the other prostaglandins of this invention may be similarly obtained.

EXAMPLE I

Vaginal Tablet of PGE₂-Bisulfite

|  | G. |
|---|---|
| Microcrystalline cellulose | 10 |
| Mannitol | 12.5 |
| Tartaric Acid | 10 |
| Sodium Bicarbonate | 10 |
| Carboxymethylcellulose-Calcium | 2 |

Granules are prepared by mixing the above ingredients and by adding to the mixture 0.5 g. PVP dissolved in a small amount of methanol as a binder. After suitable drying, the granules are passed through a 12 mesh sieve to obtain granules with uniform dimension. To these granules, the following ingredients are added:

|  | G. |
|---|---|
| PGE₂ | 2.0 |
| Carboxymethylcellulose-Calcium | 2.3 |
| Sodium Bisulfite | 2.0 |
| Magnesium Stearate | 0.5 |

Effervescent vaginal tablets are obtained, each containing 20 mg. PGE₂ by converting the mixture into tablet forms, each weighing 500 mg.

EXAMPLE II

PGE₁-Bisulfite Tablets

Granules are prepared by proper mixing of the following 17.5 g. lactose, 3.9 g. starch, and by adding hydroxypropyl cellulose in 0.5 g. of methanol as a binder. After satisfactory drying, they are passed through a 12 mesh sieve to obtain uniform size granules. After adding 2 g. of $PGE_1$, 2 g. of sodium bisulfite and 20 mg. of magnesium stearate to the granules, tablets are prepared each of which has a diameter of 8.5 mm. and weighed 250 mg. Each tablet contained 20 mg. of $PGE_1$.

EXAMPLE III

Capsules of $PGE_1$-Bisulfite

|  | G. |
|---|---|
| $PGE_1$ | 0.4 |
| Mannitol | 3.0 |
| Sodium Bisulfite | 0.4 |
| Corn Starch | 0.4 |

The above ingredients are mixed well and passed through a 32 mesh sieve into No. 3 capsules. Each capsule contains 20 mg. of $PGE_1$.

EXAMPLE IV $PGE_1$-Bisulfite for Injection $PGE_1$ in powder form is used in filling ampules each containing 1 mg. and sodium bisulfite 10 mg. Each ampule is flushed with nitrogen and filled with 0.9% saline solution for injection.

EXAMPLE V $PGE_2$-Bisulfite for Infusion $PGE_2$ is used in filling vials each containing 10 mg. and sodium bisulfite 30 mg. Each vial is flushed with nitrogen and filled with 90% sterile aqueous ethanol. Such a solution may be diluted with 0.9% saline solution for infusion containing a tris-(hydroxymethyl)-aminomethane-HCl buffer at pH 7.2.

EXAMPLE VI $PGE_2$-Bisulfite for Aerosol

|  | G. |
|---|---|
| $PGE_2$ | 0.015 |
| Sodium Bisulfite | 0.005 |
| Sodium Lactate | 0.011 |
| Lactic acid | 0.007 |
| Ethanol | 6 |
| 29/71 115/114 Freon mixture—Q.s. to 15 | |

The resulting solutions are cold filled into plastic coated aerosol containers previously flushed with nitrogen. These containers are sealed with metered valves issuing 50 μg. doses.

EXAMPLE VII $PGE_2$-Bisulfite for Nasal Spray or Nasal Solution

| $PGE_2$ | mg | 0.5 |
|---|---|---|
| Sodium bisulfite | mg | 2.0 |
| Glycine | mg | 3.8 |
| Sorbitol | mg | 40.0 |
| Phenylmercuric nitrate | mg | 0.02 |
| Benzalkonium chloride | mg | 0.2 |
| Sodium hydroxide (pH) | Q.s. | 6.5 |
| Purified water, ml. | Q.s. | 1.0 |

The resulting solution is packaged into a suitable plastic nebulizer or a suitable dropper bottle.

EXAMPLE VIII $PGE_1$-Bisulfite Aqueous Vaginal Cream

| $PGE_1$ | g | 5.0 |
|---|---|---|
| Ethanol | ml | 10 |
| Triethanolamine | ml | 0.06 |
| Sodium bisulfite | g | 2.00 |
| Glycerin | ml | 2.50 |
| Glycol monostearate | g | 3.50 |
| Stearic acid | g | 12.00 |
| Water | g | 100.00 |

The soap is conveniently formed by adding, with constant stirring, a warm solution of the oil soluble ingredients to an aqueous solution of glycerin, sodium bisulfite, and triethanolamine warmed to the same temperature. On cooling the cream, the ethanolic suspension of $PGE_1$ is evenly dispersed. The cream has a pH of approximately 7.2 and is packaged into collapsible tubes.

EXAMPLE IX

N-acetyl-Prostaglandin $E_2$-Carboxamide Suspension for Aerosol

|  | G. |
|---|---|
| N-acetyl-Prostaglandin $E_2$-Carboxamide (particles 1–5 micron size) | 0.015 |
| Sodium bisulfite (particles 1–5 microns) | 0.015 |
| Span 85 (sorbitan trioleate) | 0.020 |
| 29/71 115/114 Freon mixture—Q.s. to 15 | |

The particulate solids are mixed intimately with the suspending agent (Span 85) and the Freon cold filled into dry plastic coated aerosol containers.

EXAMPLE X

Tetrazoyl Prostaglandin $E_2$ Suspension for Aerosol

|  | G. |
|---|---|
| Tetrazoyl Prostaglandin $E_2$ | 0.05 |
| Sodium metabisulfite (1–5 microns) | 0.02 |
| Oleyl alcohol | 0.10 |
| 29/71 115/114 Freon mixture—Q.s. to 15 | |

The prostaglandin derivative and the metabisulfite are mixed intimately with the oleyl alcohol. The cold Freon mixture is then added to the dry aerosol containers.

EXAMPLE XI

16-Phenyl-Prostaglandin $E_2$ for Nasal Solution

| 16-phenyl-Prostaglandin $E_2$ | mg | 0.5 |
|---|---|---|
| Sodium metabisulfite | mg | 0.5 |
| Sodium lactate | mg | 11.0 |
| Lactic acid | mg | 7.0 |
| Ascorbic acid | mg | 5.0 |
| Ethanol | ml | 0.2 |
| Water | ml | 1.0 |

The resulting mixture is packaged into a suitable nebulizer.

EXAMPLE XII 19-oxa-Prostaglandin $E_2$ for Injection

| 19-oxa-Prostaglandin | mg | 5.0 |
|---|---|---|
| Potassium bisulfite | mg | 1.5 |
| Ethanol | ml | 0.5 |
| Water for Injection | ml | Q.s. to 2.0 |

The solution is filtered through a millipore G.S. filter and filled into suitable ampules which are then sealed.

EXAMPLE XIII

Vaginal Tablet of 15-Methyl $PGE_2$

|  | G. |
|---|---|
| Microcrystalline cellulose | 10 |
| Sorbitol | 12.5 |
| Tartaric acid | 10 |
| Sodium glycine carbonate | 10 |
| Carboxymethylcellulose-Calcium | 2 |

Granules are prepared by mixing the above ingredients and by adding to the mixture 0.5 g. PVP dissolved in a small amount of methanol as a binder. After suitable drying, the granules are passed through a 12 mesh sieve to obtain granules with uniform dimension. To these granules, the following ingredients are added:

|  | G. |
|---|---|
| 15-Methyl $PGE_2$ | 0.2 |
| Carboxymethylcellulose-Calcium | 2.3 |
| Sodium bisulfite | 2 |
| Magnesium stearate | 0.5 |

Effervescent vaginal tablets are obtained, each containing 2 mg. 15-methyl $PGE_2$, by converting the mixture into tablet forms each weighing 500 mg.

EXAMPLE XIV
15-Methyl $PGE_2$ for Injection

15-Methyl $PGE_2$ in powder form is used in filling ampules, each containing 0.1 mg. and sodium bisulfite 1 mg. Each ampule is flushed with nitrogen and filled with 0.9% saline solution for injection.

EXAMPLE XV
15-Methyl $PGE_2$-Bisulfite for Infusion

15-Methyl $PGE_2$ is used in filling vials, each containing 1 mg. and sodium bisulfite 3 mg. Each vial is flushed with nitrogen and filled with 90% sterile aqueous ethanol. Such a solution may be diluted with 0.9% saline solution for infusion containing a tris(hydroxymethyl)-aminomethane-HCl buffer of pH 7.2.

EXAMPLE XVI
15-Methyl $PGE_2$ Vaginal Jelly

| | | |
|---|---|---|
| 15-Methyl $PGE_2$ Vaginal Jelly | g | 0.5 |
| Methylparaben | g | 0.05 |
| Polyethylene glycol of monoisooctyl phenyl ether | g | 0.3 |
| Glycerin | ml | 8.0 |
| Sodium borate | g | 3.0 |
| Sodium bisulfite | g | 2.0 |
| Purified Irish moss | g | 0.8 |
| Tragacanth | g | 1.8 |
| Water, g.—to 100 | | |

The gums are first dispersed in glycerin and 50% of the water is added with rapid stirring. The remaining ingredients are added as an aqueous slurry and distributed to form a uniform gel.

EXAMPLE XVII
15-Methyl $PGE_2$-Bisulfite Capsules

Granules are prepared by proper mixing of the following: 17.5 g. lactose, 3.9 g. starch, and by adding 0.5 g. ethylcellulose in isopropyl alcohol as a binder. After satisfactory drying, they are passed through a 12 mesh sieve to obtain uniform size granules. After adding 200 mg. 15-methyl $PGE_2$, 2 g. of sodium bisulfite and 20 mg. of magnesium stearate to the granules, capsules are prepared, each of which contains 2 mg. 15-methyl $PGE_2$.

What is claimed is:

1. A stabilized pharmaceutical composition comprising a biologically active prostaglandin of the E-series and a storage stabilizing amount of an alkali or alkaline earth metal sulfite salt.
2. The composition of Claim 1 containing a pharmaceutically acceptable liquid medium.
3. The composition of Claim 2 wherein said medium is ethanol.
4. The composition of Claim 1 wherein said salt is sodium metabisulfite.
5. The composition of Claim 1 wherein said salt is sodium sulfite.
6. The composition of Claim 1 wherein said storage stabilizing amount of said salt is from about 0.5 to 20 moles per mole of prostaglandin.
7. The composition of Claim 1 wherein said storage stabilizing amount of said salt is from about 1.0 to 10 moles per mole of prostaglandin.
8. The composition of Claim 1 containing a volatile aerosol propellant.
9. The composition of Claim 1 wherein said prostaglandin is selected from $PGE_1$ or $PGE_2$.

References Cited
UNITED STATES PATENTS

| | | | |
|---|---|---|---|
| 2,480,532 | 8/1949 | Winnek et al. | 424—175 |
| 2,786,835 | 3/1957 | Pinson et al. | 424—175 |
| 3,132,993 | 5/1964 | Granatek | 424—175 |

SAM ROSEN, Primary Examiner

U.S. Cl. X.R.

260—468 D, 514 D; 424—175, 312, 318